United States Patent
Awadh et al.

(10) Patent No.: US 10,889,688 B2
(45) Date of Patent: Jan. 12, 2021

(54) CROSSLINKED POLYMER RESIN FOR CONTAMINANT ADSORPTION FROM WATER

(71) Applicant: King Fahd University of Petroleum and Minerals, Dhahran (SA)

(72) Inventors: Tawfik Abdo Saleh Awadh, Dhahran (SA); Shaikh A. Ali, Dhahran (SA); Ihsan B. Rachman, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 308 days.

(21) Appl. No.: 16/001,307

(22) Filed: Jun. 6, 2018

(65) Prior Publication Data
US 2019/0375895 A1 Dec. 12, 2019

(51) Int. Cl.
| | |
|---|---|
| *C08G 75/22* | (2006.01) |
| *C08F 279/02* | (2006.01) |
| *C02F 1/28* | (2006.01) |
| *B01J 20/26* | (2006.01) |
| *B01J 20/28* | (2006.01) |
| *C02F 101/20* | (2006.01) |
| *C02F 101/30* | (2006.01) |

(52) U.S. Cl.
CPC ............ *C08G 75/22* (2013.01); *B01J 20/267* (2013.01); *B01J 20/28059* (2013.01); *B01J 20/28083* (2013.01); *C02F 1/285* (2013.01); *C08F 279/02* (2013.01); *C02F 2101/20* (2013.01); *C02F 2101/308* (2013.01); *C02F 2303/16* (2013.01); *C08F 2810/20* (2013.01)

(58) Field of Classification Search
CPC ... C08G 75/22; B01J 20/267; B01J 20/28059; B01J 20/28083; C02F 1/285; C02F 2101/20; C02F 2101/308; C02F 2303/16; C08F 1/285; C08F 2810/20
See application file for complete search history.

(56) References Cited

U.S. PATENT DOCUMENTS

| | | |
|---|---|---|
| 8,614,260 B1 | 12/2013 | Hamouz et al. |
| 2014/0107236 A1 | 4/2014 | Ali et al. |

(Continued)

OTHER PUBLICATIONS

Saleh et al. Synthesis of hydrophobic cross-linked polyzwitterionic acid for simultaneous sorption of Eriochrome black T and chromium ions from binary hazardous waters. Journal of Colloid and Interface Science 468 (2016) 324-333. (Year: 2016).*

(Continued)

*Primary Examiner* — Katherine Zalasky McDonald
(74) *Attorney, Agent, or Firm* — Oblon, McClelland, Maier & Neustadt, L.L.P.

(57) ABSTRACT

Cross-linked polymer resins and related salts, solvates, tautomers or stereoisomers are described herein. The cross-linked polymer resins may comprise monomer units of N,N-diallyl aminoalkylphosphonate, a hydrophobic pendant, a tetraallylpiperazinium cross-linker, and sulfur dioxide. A method for producing the cross-linked polymer resins is described. The cross-linked polymer resins may be used as adsorbent materials for the removal of heavy metal ions and contaminant dyes from aqueous solutions. Used cross-linked polymer resins may be removed from solution, cleaned, and reused while maintaining adsorption capacity.

20 Claims, 18 Drawing Sheets

(56) References Cited

U.S. PATENT DOCUMENTS

| | | |
|---|---|---|
| 2014/0323685 A1 | 10/2014 | Ali et al. |
| 2015/0073097 A1 | 3/2015 | Al Hamouz et al. |
| 2016/0264690 A1 | 9/2016 | Haladu et al. |
| 2017/0113215 A1 | 4/2017 | Jamiu et al. |
| 2017/0197847 A1 | 7/2017 | Saleh et al. |

OTHER PUBLICATIONS

Saleh, Tawfik A., et al. ; Aminomethylphosphonate Chelating Ligand and Octadecyl Alkyl Chain in a Resin for Simultaneous Removal of Co(II) Ions and Organic Contaminants ; Journal of Chemical & Engineering Date, 2016, 61 (9), pp. 3377-3385 ; Aug. 15, 2016 ; Abstract ; https://doi.org/10.1021/acs.jced.6b00475.

Ali, Shaikh A., et al. ; New Chelating Ion-Exchange Resin Synthesized via the Cyclopolymerization Protocol and its Uptake Performance for Metal Ion Removal ; Industrial & Engineering Chemistry Research, 2015, 54(40) pp. 9689-9698 ; Sep. 28, 2015 ; Abstract ; https://doi.org/10.1021/acs.iecr.5b02267.

Saleh, Tawfik A., et al. ; A novel cross-linked pH-responsive tetrapolymer: Synthesis, characterization and sorption evaluation towards Cr(III) ; Chemical Engineering Journal, vol. 267 , pp. 9-19 ; Jun. 1, 2015 ; Abstract ; https://doi.org/10.1016/j.cej.2015.01.083.

Al Hamouz, Othman Charles S., et al. ; Removal of Zinc and Cadmium Ions Using a Cross-linked Polyaminophosphonate ; Journal of Macromolecular Science, Part A, Pure Applied Chemistry, vol. 50, 2013—Issue 4 ; pp. 375-384 ; Mar. 5, 2013 ; Abstract ; https://doi.org/10.1080/10601325.2013.768110.

Al Hamouz, Othman Charles S., et al. ; Novel Cross-Linked Polyphosphonate for the Removal of Pb2+ and Cu2+ from Aqueous Solution ; Industrial Engineering Chemistry Research, 2012, 51(43) ; pp. 14178-14187 ; Oct. 10, 2012 ; Abstract ; https://doi.org/10.1021/ie301231k.

Al Hamouz, Othman Charles S., et al. ; Removal of heavy metal ions using a novel cross-linked polyzwitteronic phosphonate ; Separation and Purification Technology, vol. 98, pp. 94-101 ; Sep. 19, 2012 ; Abstract ; https://doi.org/10.1016/j.seppur.2012.07.019.

Jamiu, Zakariyah A., et al. ; Biogenic glutamic acid-based resin: Its synthesis and application in the removal of cobalt(II) ; Journal of Hazardous Materials, vol. 327, pp. 44-54 ; Apr. 5, 2017 ; Abstract https://doi.org/10.1016/j.jhazmat.2016.12.041.

Saleh, Tawfik A., et al/ ; Synthesis of hydrophobic cross-linked polyzwitterionic acid for simultaneous sorption of Eriochrome black T and chromium ions from binary hazardous water ; Journal of Colloid and Interface Science, vol. 486, pp. 324-333 ; Apr. 15, 2016 ; Abstract ; https://doi.org/10.1016/j.jcis.2016.01.057.

Ali, Shaikh A., et al. ; A novel cross-linked polyzwitterion/anion having pHresponsive carboxylate and sulfonate groups for the removal of Sr from aqueous solution at low concentrations ; Reactive and Functional Polymers, vol. 73, Issue 6, pp. 796-804 ; Jun. 2013 ; Abstract ; https://doi.org/10.1016/j.reactfunctpolym.2013.03.011.

Ali, Shaikh A., et al. ; Simultaneous trapping of Cr(III) and organic dyes by a pH-responsive resin containing zwitterionic aminomethylphosphonate ligands and hydrophobic pendants; Chemical Engineering Journal 330, pp. 663-674 ; 2017 ; 12 Pages ; https://doi.org/10.1016/j.cej.2017.08.003.

Saleh, Tawfik A., et al. ; Tailoring hydrophobic branch in polyzwitterionic resin for simultaneous capturing of Hg(II) and methylene blue with response surface optimization ; Scientific Reports, 4573 ; 15 Pages ; https://doi.org/10.1038/s41598-017-04624-6.

\* cited by examiner

| Element | Apparent Concentration | k Ratio | Wt% |
|---|---|---|---|
| C | 10.45 | 0.10450 | 48.26 |
| N | 4.09 | 0.00728 | 8.53 |
| O | 13.54 | 0.04556 | 29.32 |
| P | 9.79 | 0.05474 | 4.39 |
| S | 9.63 | 0.08294 | 9.02 |
| Cl | 0.61 | 0.00534 | 0.47 |
| Total: | | | 100 |

FIG. 10C

| Element | Apparent Concentration | k Ratio | Wt% |
|---|---|---|---|
| C | 8.10 | 0.08101 | 48.04 |
| O | 11.49 | 0.03865 | 27.18 |
| N | 4.08 | 0.00777 | 8.42 |
| S | 13.66 | 0.11769 | 9.61 |
| P | 13.51 | 0.07555 | 4.31 |
| Cl | 0.77 | 0.00676 | 0.40 |
| Cr | 0.05 | 0.00049 | 2.04 |
| Total: | | | 100 |

FIG. 11C

Methylene blue chloride

CROSSLINKED POLYMER RESIN FOR CONTAMINANT ADSORPTION FROM WATER

STATEMENT REGARDING PRIOR DISCLOSURES BY THE INVENTORS

Aspects of this technology were disclosed in the documents, Ali S. A., Rachman, I. B., and Saleh, T. A., "Simultaneous trapping of Cr(III) and organic dyes by a pH-responsive resin containing zwitterionic aminomethylphosphonate ligands and hydrophobic pendants," Chemical Engineering Journal 330, 663-674 (2017), doi:10.1016/j.cej.2017.08.003, and Saleh, T. A., Rachman, I. B., and Ali S. A., "Tailoring hydrophobic branch in polyzwitterionic resin for simultaneous capturing of Hg(II) and methylene blue with response surface optimization," Scientific Reports 7, 4573, (2017), doi:10.1038/s41598-017-04624-6, which are each incorporated herein by reference in their entireties.

STATEMENT OF ACKNOWLEDGEMENT

This project was prepared with financial support from King Fand University of Petroleum & Minerals (KFUPM), Saudi Arabia through Project No. IN131053 under the Deanship of Research.

BACKGROUND OF THE INVENTION

Technical Field

The present invention relates to a cross-linked polymer resin, a method of making, and a method of using to adsorb contaminants from an aqueous solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The presence and toxic effect of pollutants in water bodies have been identified as a global challenge. See L. D. Mafu, T. M. Msagati, B. B. Mamba, Adsorption studies for the simultaneous removal of arsenic and selenium using naturally prepared adsorbent materials. *International Journal of Environmental Science and Technology*, 11 (2013). 1723-1732; and D. Mohan, C. U. Pittman, Arsenic removal from water/wastewater using adsorbents—A critical review. *Journal of Hazardous Materials*, 142 (1-2) (2007) 1-53, each incorporated herein by reference in their entirety. The presence of pollutants in the environment can be attributed to both natural and anthropogenic sources. See B. Ergül, N. Bektaş, M. S. Öncel, The Use of Manganese Oxide Minerals for the Removal Arsenic and Selenium Anions from Aqueous Solutions. *Energy and Environmental Engineering*, 2 (2014) 103-112, incorporated herein by reference in its entirety. Heavy metal ions (HMI) are non-biodegradable pollutants accumulated in groundwater and on the soil surface as a waste of some industrial processes such as mining, painting, and anti-corrosive coating. Heavy metal ions over an acceptable level can cause a variety of diseases, which include loss of memory, kidney and renal problems, diarhea, as well as reproductive disorders. The presence of the metal contaminants may lead to neurological disorder, damage to both respiratory and cardiovascular organs, skin diseases, and cancer. See P. Mondal, C. B. Majumder, B. Mohanty, Laboratory based approaches for arsenic remediation from contaminated water: recent developments. *Journal of Hazardous Materials*, 137 (2006) 464-79, incorporated herein by reference in its entirety. The contaminants are also known to biomagnify in organisms thereby increasing their toxic effects as they move up the food chain. See M. Barwick, W. Maher, Biotransference and biomagnification of selenium copper, cadmium, zinc, arsenic and lead in a temperate seagrass ecosystem from Lake Macquarie Estuary, NSW, Australia. *Marine Environmental Research*, 56 (2003) 471-502; and T. A. Saleh, Mercury sorption by silica/carbon nanotubes and silica/activated carbon: a comparison study, *J. Water Supply Res. T* 64 (2015) 892-903, each incorporated herein by reference in their entirety. According to the Environmental Protection Agency, the maximum acceptable level of the chromium, one of the most dangerous metal ions, in drinking water is 0.1 mg·L$^{-1}$.

To overcome the problems caused by pollutants, more efforts are required to minimize their impact on the environment. Different removal methods have been adopted in the treatment of Cr(III)-contaminated waters, including nanofiltration, lime-softening, adsorption, reverse osmosis, coagulation, electrocoagulation, ion exchange, chemical precipitation, etc. Adsorption is considered a promising method relying on the efficiency of the sorbent materials. See H. Saitúa, M. Campderrós, S. Cerutti, A. P. Padilla, Effect of operating conditions in removal of arsenic from water by nanofiltration membrane. *Desalination*, 172 (2005) 173-180; T. R. Harper, N. W. Kingham, Removal of arsenic from wastewater using chemical precipitation methods. *Water Environment Research*, 64 (1992) 200-203; S. Song, A. Lopez-Valdivieso, D. J. Hernandez-Campos, C. Peng, M. G. Monroy-Fernandez, I. Razo-Soto, Arsenic removal from high-arsenic water by enhanced coagulation with ferric ions and coarse calcite. *Water Research*, 40 (2006) 364-372; P. R. Kumar, S. Chaudhari, K. C. Khilar, S. P. Mahajan, Removal of arsenic from water by electrocoagulation. *Chemosphere*, 55 (2004) 1245-1252; X. Meng, G. P. Korfiatis, C. Christodoulatos, S. Bang, Treatment of arsenic in Bangladesh well water using a household co-precipitation and filtration system. *Water Research*, 35 (2001) 2805-2810, each incorporated herein by reference in their entirety. The use of water-insoluble/swellable solid adsorbents has been found to be efficient because of their phase separation and high enrichment efficiency. See T. M. Suzuki, M. L. Tanco, D. A. Pacheco Tanaka, H. Matsunaga, T. Yokoyama, Adsorption characteristics and removal of oxo-anions of arsenic and selenium on the porous polymers loaded with monoclinic hydrous zirconium oxide. *Sep. science and techn.*, 36 (2001) 103-111; and T. A. Saleh, Nanocomposite of carbon nanotubes/silica nanoparticles and their use for adsorption of Pb (II): from surface properties to sorption mechanism, *Desalination and Water Treatment* 57 (2016) 10730-10744, each incorporated herein by reference in their entirety.

Designing an appropriate and efficient adsorbent for specific pollutants is the key step for a successful adsorption process. For metal removal from wastewater, conventional adsorbents like clay activated carbon and nanomaterials are used. Inexpensive biodegradable natural polymers such as cellulose, chitosan, and starch are also used because of their abundance, high efficiency, non-toxic nature, and eco-friendliness. At industrial application, there is a need for more advanced properties of an adsorbent such as fast adsorption kinetics, high capacity, and temperature stability. Polymer materials could be used as candidates to fulfill such industrial requirements. Zwitterionic cross-linked organic and inorganic hybrid polymers drew attention because they can remove HMI by electrostatic effects. See T. M. Suzuki, et al.; and T. A. Saleh, each incorporated herein by reference in their entirety.

The production of total dyes exceeds the rate of 700,000 tons per year; the discharge of ≈2% of the total production in wastewater poses a serious environmental challenge owing to their high toxicity and carcinogenic and mutagenic characteristics. See G. J. Alaerts, P. Kelderman, Use of coconut shell-based activated carbon for chromium (III) removal. *Water Sci Technol.* 21 (1989) 1701-1704; and F. Kanwal, M. Imran, L. Mitu, Z. Rashid, H. Razzaq, Q. Ain, Removal of Chromium(III) Using Synthetic Polymers, Copolymers and their Sulfonated Derivatives as Adsorbents, *E-Journal of Chemistry*, 9 (2012), 621-630, each incorporated herein by reference in their entirety. Solid adsorbents, having advantages of low cost and simple operation without causing secondary pollution, are widely used to remove dyes from wastewater. See M. Rafatullah, O. Sulaiman, R. Hashim, A, Ahmad, Adsorption of methylene blue on low-cost adsorbents: a review. *J Hazard Mater,* 177 (2010) 70-80; and P. Liu, L. X. Zhang, Adsorption of dyes from aqueous solutions or suspensions with clay nano-adsorbents. *Sep Purif Technol,* 58 (2007) 32-39, each incorporated herein by reference in their entirety. However, adsorbents like activated carbon, silica, zeolite, and chitosan, etc., have relatively low adsorption capacity owing to their weak affinity to HMI and dyes. See S. Kabiri, D. N. H. Tran, M. A. Cole, D. Losic, Functionalized three-dimensional (3D) graphene composite for high efficiency removal of mercury, *Environ. Sci.: Water Res. Technol.,* 2016, 2, 390; L. M. Cui, X. Y. Guo, Q. Wei, Y. G. Wang, L. Gao, L. G. Yan, T. Yan, B. Du, Removal of mercury and methylene blue from aqueous solution by xanthate functionalized magnetic graphene oxide: Sorption kinetic and uptake mechanism, *J. Colloid Interface Sci.*, 2015, 439, 112-120; A. Mehdinia, M. Akbari, T. B. Kayyal, M. Azad, High-efficient mercury removal from environmental water samples using di-thio grafted on magnetic mesoporous silica nanoparticles, *Environ. Sci. Pollut. Res.,* 2015, 22, 2155-2165; T. A. Saleh, Isotherm, kinetic, and thermodynamic studies on Hg (II) adsorption from aqueous solution by silica-multiwall carbon nanotubes, *Envir. Scienc. Pollut. Res.* 22 (2015), 16721-16731, each incorporated herein by reference in their entirety. Graphene oxide (GO), as well as its decorated derivatives, have got considerable attention for environmental applications because of their enormous surface area. See S. Kabiri et al.; Y. F. Guo, J. Deng, J. Y. Zhu, C. Zhou, C. Y. Zhou, X. J. Zhou, R. B. Bai, Removal of anionic azo dye from water with activated graphene oxide: kinetic, equilibrium and thermodynamic modeling, *RSC Adv.,* 2016, 6, 39762-39773; T. A. Saleh, A. Sari, M. Tuzen, Effective adsorption of antimony (III) from aqueous solutions by polyamide-graphene composite as a novel adsorbent, *Chem. Eng. J.* 307 (2017) 230-238; and B. Henriques, G. Goncalves, N. Emami, E. Pereira, M. Vila, P. Marques, Optimized graphene oxide foam with enhanced performance and high selectivity for mercury removal from water, *J. Hazard. Mater.,* 2016, 301, 453-461, each incorporated herein by reference in their entirety. However, GO has its inherent problem of aggregation or agglomeration in aqueous solution owing to the strong π-π interactions between graphitic layers; as a result, a low effective surface area limits their wider adoption as adsorption materials. See S. Kabiri et al.; Y. K. Zhang, T. Yan, L. G. Yan, X. Y. Guo, L. M. Cui, Q. Wei, B. Du, Preparation of novel cobalt ferrite/chitosan grafted with graphene composite as effective adsorbents for mercury ions, *J. Mol. Liq.,* 2014, 198, 381, incorporated herein by reference in its entirety.

Thus, there is tremendous scope to develop new materials with high affinity to both HMI and dyes. Aminomethylphosphonate ($-NH^+CH_2PO_3H^-$) as a chelating ligand, has etched a place of distinction in the removal of heavy metal ions. See S. D. Alexandratos, Ion-Exchange Resins: A Retrospective from Industrial and Engineering Chemistry Research. *Ind Eng. Chem. Res.* 48 (2009) 388-398; A. Deepatana, M. Valix, Steric hindrance effect on adsorption of metal-organic complexes onto aminophosphonate chelating resin. *Desalination,* 218 (2008) 297-303; Y. Hamabe, Y. Hirashima, J. Izumi, K. Yamabe, A. Jyo, Properties of a bifunctional chelating resin containing aminomethylphosphonate and sulfonate derived from poly(ω-bromobutylstyrene-co-divinylbenzene) beads. *React. Funct. Polym.* 69 (2009) 828-835; A. Deepatana, M. Valix, Recovery of nickel and cobalt from organic acid complexes: adsorption mechanisms of metal-organic complexes onto aminophosphonate chelating resin. *J. Hazard. Mater.* 137 (2006) 925-33; S. A. Ali, I. W. Kazi, Nisar Ullah, A New Chelating Ion-Exchange Resin Synthesized via Cyclopolymerization Protocol and its Uptake Performance for Metal Ions Removal, *Ind. Eng. Chem. Res.,* 54 (2015) 9689-9698, each incorporated herein by reference in their entirety. Being the pH-responsive zwitterionic motifs, the ligand may be tuned to trap metal cations, toxic anions (like $AsO_4^-$), as well as organic dyes of both positive and negative charges. The affinity towards dyes may as well be augmented by the presence of hydrophobic aromatics capable of π-π interactions thereby leading to their association and entrapment.

In view of the forgoing, one objective of the present invention is to synthesize a novel functionalized resin with hydrophilic motifs of aminomethylphosphonate and hydrophobic pendants of 4-(6-hexyloxy)biphenyl as a sorbent for the removal of Cr(III) as a model case as well as several organic dyes from aqueous solutions.

BRIEF SUMMARY OF THE INVENTION

According to a first aspect, the present disclosure relates to a cross-linked polymer resin of formula (I)

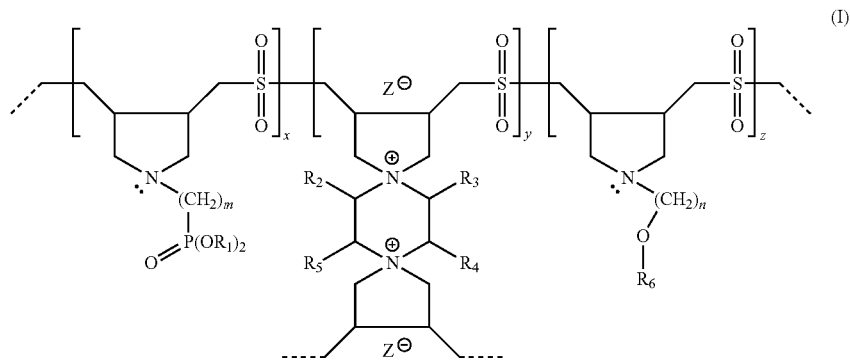

(I)

or a salt, solvate, tautomer, or stereoisomer thereof. Each $R_1$ is —H, a positive counter ion, an optionally substituted alkyl, an optionally substituted cycloalkyl, or an optionally substituted aryl; each $R_2$, $R_3$, $R_4$, and $R_5$ are independently —H, an optionally substituted alkyl, an optionally substituted cycloalkyl, or an optionally substituted aryl; $R_6$ is an optionally substituted arylalkyl; wherein m and n are independently a whole number in the range of 1-10; x, y, and z are independently a whole number greater than zero; and Z is a counter ion.

In one embodiment, a ratio of x to y is 5:1-10:1, and a ratio of z to y is 1:1-5:1.

In one embodiment, a compound of formula (I) is porous and has a specific surface area of 40-70 $m^2/g$.

In one embodiment, a compound of formula (I) is porous and has an average pore diameter of 4-20 nm.

In one embodiment, a compound of formula (I) is

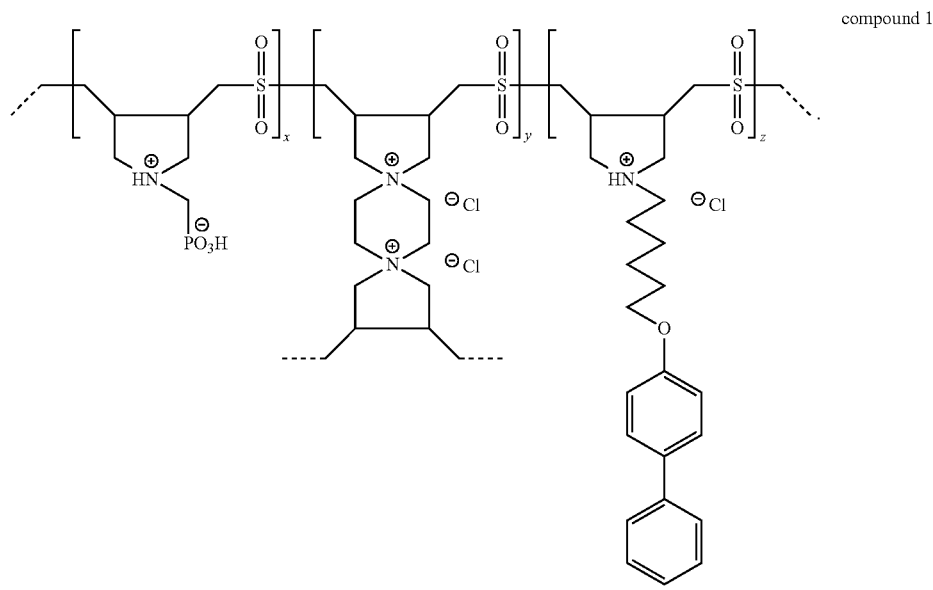

compound 1

In one embodiment, a compound of formula (I) is

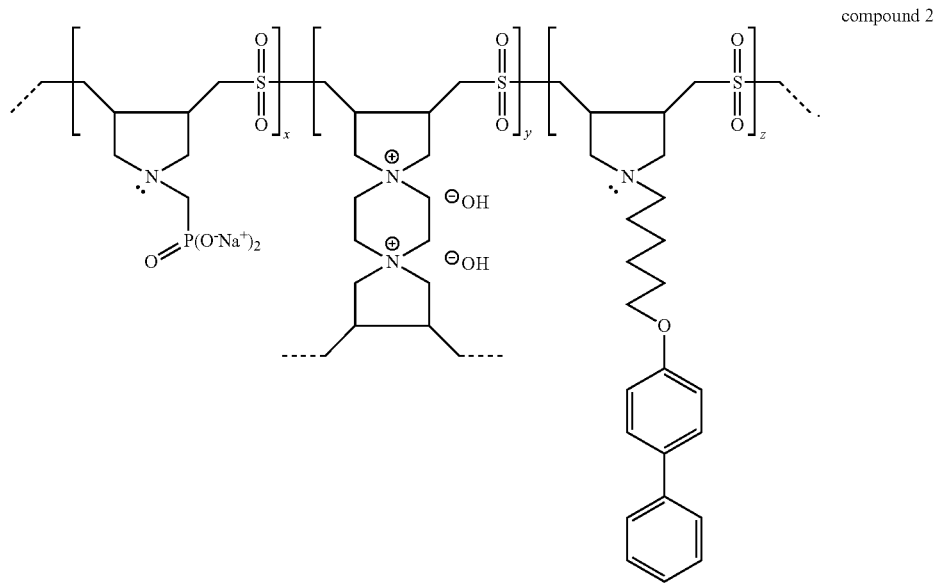

compound 2

According to a second aspect, the present disclosure relates to a method for producing the cross-linked polymer resin of the first aspect. This method involves reacting an aryloxy halide with a diallylamine to form a hydrophobic pendant monomer; and cyclocopolymerizing the hydrophobic pendant monomer with a N,N-diallyl aminoalkylphosphonate monomer, a tetraallylpiperazinium cross-linking monomer, dissolved sulfur dioxide, and a free radical initiator in a solvent to form the cross-linked polymer resin.

In one embodiment, the N,N-diallyl aminoalkylphosphonate monomer has a structure of formula (II)

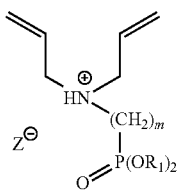

(II)

or a salt, solvate, tautomer, or stereoisomer thereof, where each $R_1$ is —H, a positive counter ion, an optionally substituted alkyl, an optionally substituted cycloalkyl, or an optionally substituted aryl; and m is a whole number in the range of 1-10.

In a further embodiment, the N,N-diallyl aminoalkylphosphonate monomer compound of formula (II) is

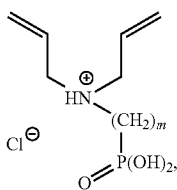

where m is 1 or 3.

In one embodiment, the tetraallylpiperazinium cross-linking monomer has a structure of formula (III)

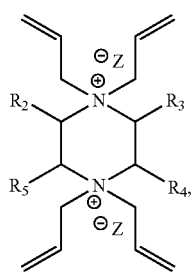

(III)

or a salt, solvate, tautomer or stereoisomer thereof, where $R_2$, $R_3$, $R_4$, and $R_5$ are independently —H, an optionally substituted alkyl, an optionally substituted cycloalkyl, or an optionally substituted aryl, and Z is a counter ion.

In a further embodiment, the tetraallylpiperazinium cross-linking monomer compound of formula (III) is

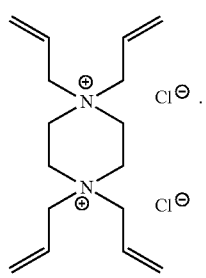

compound 5

In one embodiment, the hydrophobic pendant monomer has a structure of formula (IV)

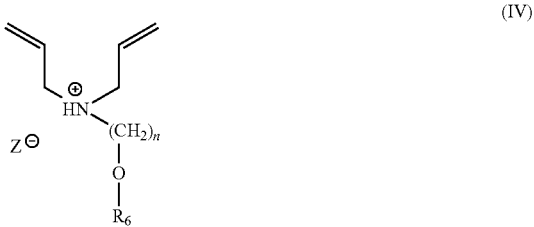

(IV)

or a salt, solvate, tautomer, or stereoisomer thereof, where $R_6$ is an optionally substituted arylalkyl, n is a whole number in the range of 1-10, and Z is a counter ion.

In a further embodiment, the hydrophobic pendant monomer compound of formula (IV) is

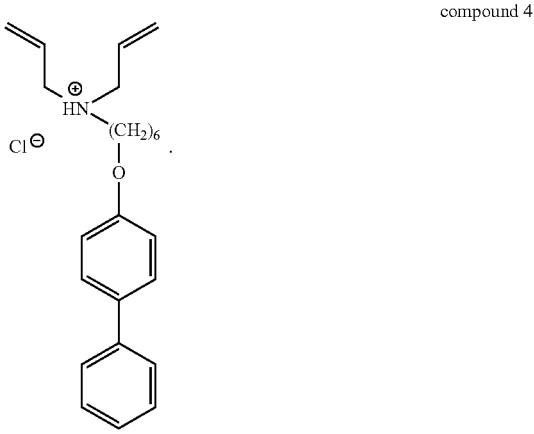

compound 4

In one embodiment, the method further comprises contacting the cross-linked polymer resin with a base to form an expanded cross-linked polymer resin.

According to a third aspect, the present disclosure relates to a method of reducing a contaminant concentration from an aqueous solution with the cross-linked polymer resin of the first aspect. This method involves contacting the cross-linked polymer resin with an aqueous solution comprising the contaminant at a contaminant concentration of 0.5-100 mg/L, where the cross-linked polymer resin reduces the contaminant concentration by adsorption.

In one embodiment, the cross-linked polymer resin has a concentration of 0.1-5.0 g/L in the aqueous solution, and the aqueous solution has a pH of 3-7.

In one embodiment, the contaminant is a heavy metal ion or a dye.

In a further embodiment, the contaminant is a heavy metal ion, and the cross-linked polymer resin has an adsorption capacity of 10-100 mg of contaminant per g of the cross-linked polymer resin.

In one embodiment, at least 90% of the total mass of the heavy metal ion is removed from the aqueous solution in at least 9 minutes.

In one embodiment, the method further comprises the steps of separating the cross-linked polymer resin from the aqueous solution to produce a recovered cross-linked polymer resin; mixing the recovered cross-linked polymer resin with an acidic solution; removing the acidic solution to produce a cleaned cross-linked polymer resin; and reusing the cleaned cross-linked polymer resin. The cleaned cross-linked polymer resin maintains an adsorption capacity for at least 5 purification cycles.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10C is a table of quantitative microanalysis from the EDX analysis of FIG. 10B.

FIG. 11C is a table of quantitative microanalysis from the EDX analysis of FIG. 11B.

DETAILED DESCRIPTION OF THE EMBODIMENTS

Figure 1:
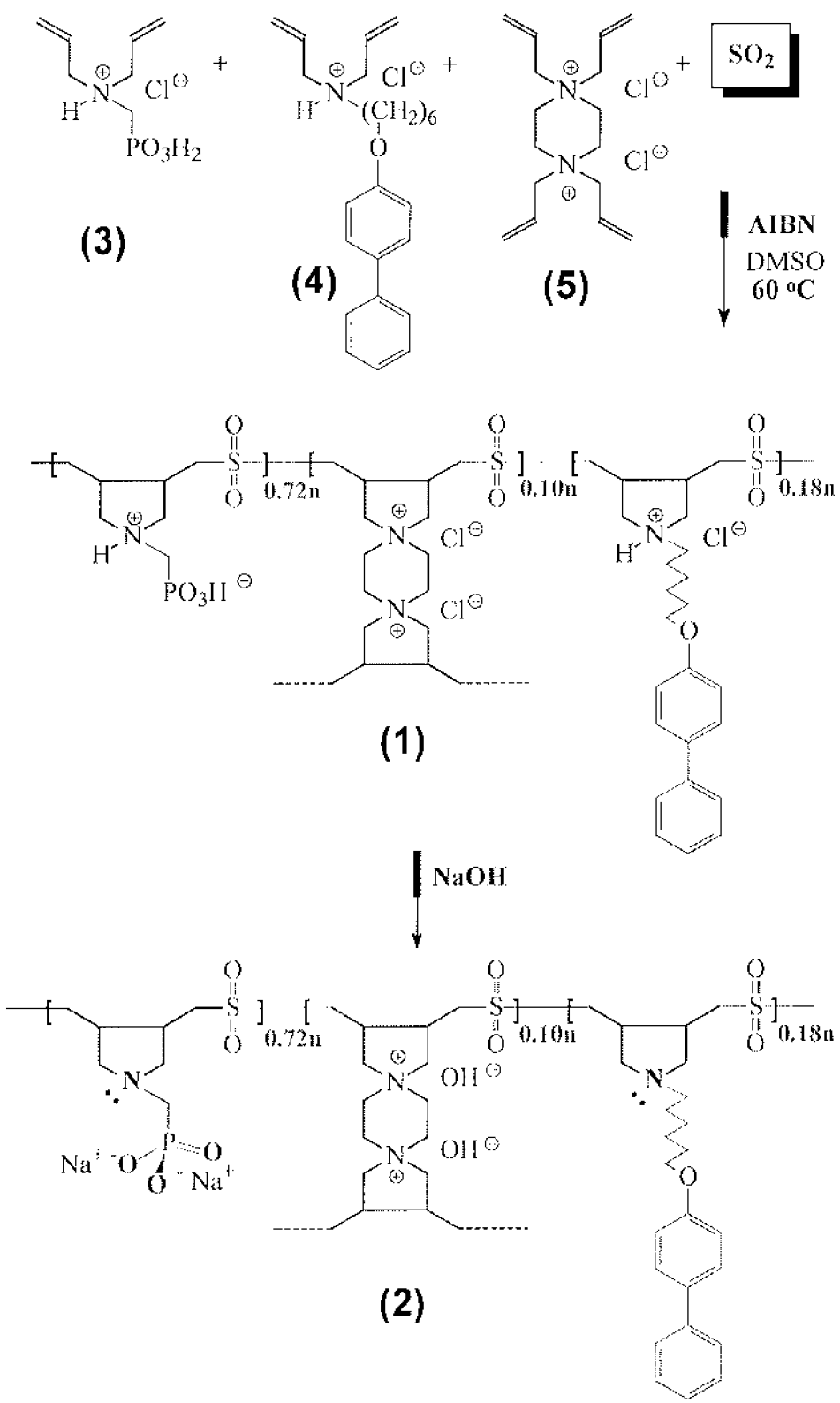
FIG. 1 is a synthetic scheme for the production of a cross-linked polymer resin of formula (I), which includes compound 1 and compound 2, from cyclocopolymerization of a N,N-diallyl aminoalkylphosphonate monomer compound 3, a hydrophobic pendant monomer compound 4, a tetraallylpiperazinium cross-linking monomer compound 5, and sulfur dioxide.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified. The chemical transformations and/or reactions described herein may proceed via standard laboratory and experimental techniques in regard to performing the reaction as well as standard purification, isolation, and characterization protocols known to those skilled in the art.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2.6H_2O$, and any other hydrated forms or mixtures. $CuCl_2$ includes both anhydrous $CuCl_2$ and $CuCl_2.2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of chromium include $^{50}Cr$, $^{52}Cr$, $^{53}Cr$, and $^{54}Cr$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein a "polymer" refers to a large molecule, or macromolecule, of many repeating subunits and/or substances composed of macromolecules. As used herein a "monomer" refers to a molecule or compound that may bind chemically to other molecules to form a polymer. As used herein the term "repeat unit" or "repeating unit" refers to a part of the polymer or resin whose repetition would produce the complete polymer chain (excluding the end groups) by linking the repeat units together successively along the chain. The process by which monomers combine end to end to form a polymer is referred to herein as "polymerization," monomers are molecules which can undergo polymerization, thereby contributing constitutional repeating units to the essential structures of a macromolecule or polymer. As used herein a "copolymer" refers to a polymer derived from more than one species of monomer and are obtained by the "copolymerization" of more than one species of monomer. Copolymers obtained by copolymerization of two monomer species may be termed bipolymers, those obtained from three monomers may be termed terpolymers and those obtained from four monomers may be termed quaterpolymers, etc. As used herein a "cyclopolymer" refers to a polymer having cyclic structures in the main polymer chain (i.e. the polymer backbone) and are obtained by the "cyclopolymerization" of appropriate monomers where one or more cyclic or ring structures, heterocyclic or homocyclic, are formed. In many cases, the cyclic structures may be formed during the cyclopolymerization which may proceed by an alternating intra-intermolecular chain mechanism for polymerization. As used herein a "cyclocopolymer" refers to a polymer sharing the definition of a copolymer and a cyclopolymer and may be formed by "cyclocopolymerization." As used herein, "cross-linking" or a "cross-link" refers to polymers and resins containing branches that connect polymer chains via bonds that link one polymer chain to another. The cross-link may be an atom, a group of atoms, or a number of branch points connected by bonds, groups of atoms, or polymer chains. In the majority of cases, a cross-link is a covalent structure or covalent bond, but the term may also describe sites of weaker chemical interactions, portions of crystallites, and even physical interactions and entanglements. The cross-linking can alter the physical and mechanical properties of the polymer. Cross-linking may be formed by chemical reactions that are initiated by heat, pressure, change in pH, and/or radiation, with or without the presence of a cross-linking agent and/or catalyst.

As used herein, a "resin" refers to a solid or highly viscous substance or polymeric macromolecule containing polymers, preferably with reactive groups.

As used herein, the term "salts" refers to derivatives of the disclosed compounds, monomers, or polymers wherein the parent compound is modified by making acid or base salts thereof. Exemplary salts include, but are not limited to, mineral or organic acid salts of basic groups such as amines, and alkali or organic salts of acidic groups such as carboxylic acids. The salts include, but are not limited to, the conventional non-toxic salts or the quaternary ammonium salts of the parent compound formed, for example, from non-toxic inorganic or organic acids. Exemplary conventional non-toxic salts include those derived from inorganic acids including, but not limited to, hydrochloric, hydrobromic, sulfuric, sulfamic, phosphoric, and nitric; and those derived from organic acids including, but not limited to, acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, isethionic and mixtures thereof and the like. Further, salts of carboxylic acid containing compounds may include cations such as lithium, sodium, potassium, magnesium, quaternary ammonium, and the like. The salts of the present disclosure may be synthesized from the parent compound that contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, non-aqueous media like ether, ethyl acetate, ethanol, isopropanol, or acetonitrile are preferred.

As used herein, the term "solvate" refers to a physical association of a compound, monomer, or polymer of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvates include, but are not limited to, hydrates, ethanolates, methanolates, isopropanolates, and mixtures thereof. Methods of solvation are generally known to those skilled in the art.

As used herein, the term "tautomer" refers to constitutional isomers of organic compounds that readily convert by the chemical reaction of tautomerization or tautomerism. The reaction commonly results in the formal migration of a hydrogen atom or proton, accompanied by a switch of a single bond and adjacent double bond. Tautomerism is a special case of structural isomerism and because of the rapid interconversion; tautomers are generally considered to be the same chemical compound. In solutions in which tautomerization is possible, a chemical equilibrium of the tautomers will be reached. The exact ratio of the tautomers depends on several factors including, but not limited to, temperature, solvent, and pH. Exemplary common tautomeric pairs include, but are not limited to, ketone and enol, enamine and imine, ketene and ynol, nitroso and oxime, amide and imidic acid, lactam and lactim (an amide and imidic acid tautomerism in heterocyclic rings), enamine and enamine, and anomers of reducing sugars.

Prototropy or prototropic tautomerism refers to the relocation of a proton. Prototropy may be considered a subset of acid base behavior. Prototropic tautomers are sets of isomeric protonation states with the same empirical formula and total charge. Tautomerizations may be catalyzed by bases (deprotonation, formation of an enolate or delocalized anion, and protonation at a different position of the anion) and/or acids (protonation, formation of a delocalized cation, and deprotonation at a different position adjacent to the cation). Two additional subcategories of tautomerization include annular tautomerism, wherein a proton can occupy two or more positions of a heterocyclic system, and ring-chain tautomerism, wherein the movement of a proton is accompanied by a change from an open structure to a ring. Valence tautomerism is a type of tautomerism in which single and/or double bonds are rapidly formed and ruptured, without migration of atoms or groups. It is distinct from prototropic tautomeism, and involves processes with rapid reorganization of bonding electrons, such as open and closed forms of certain heterocycles, such as azide-tetrazole or mesoionic munchnone-acylamino ketene. Valence tautomerism requires a change in molecular geometry unlike canonical resonance structures or mesomers. In terms of the present disclosure, the tautomerism may refer to prototropic tautomerism, annular tautomerism, ring-chain tautomerism, valence tautomerism, or mixtures thereof.

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection or their order differs. By definition, molecules that are stereoisomers of each other represent the same structural isomer. Enantiomers are two stereoisomers that are related to each other by reflection; they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers and stereoisomers are not related through a reflection operation; they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers (rotamers), or conformational isomerism refers to a form of isomerism that describes the phenomenon of molecules with the same structural formula but with different shapes due to rotations about one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans- (or E- and Z-) stereoisomers of the compounds of the present disclosure wherein rotation about the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example by chromatography, fractional crystallization, or use of a chiral agent.

As used herein, the term "substituted" refers to at least one hydrogen atom that is replaced with a non-hydrogen group, provided that normal valencies are maintained and that the substitution results in a stable compound. When a substituent is noted as "optionally substituted," the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl, or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted hetercyclyl; and mixtures thereof and the like.

As used herein, the term "alkyl" unless otherwise specified, refers to both branched and straight chain saturated aliphatic primary, secondary, and/or tertiary hydrocarbons of typically C$_1$ to C$_{10}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. As used herein, the term may also include substituted alkyl groups. Exemplary moieties with which the alkyl group can be substituted may be selected from the group including, but not limited to, hydroxyl, amino, alkylamino, arylamino, alkoxy, aryloxy, nitro, cyano, sulfonic acid, sulfate, phosphonic acid, phosphate, or phosphonate or mixtures thereof. The substituted moiety may be either protected or unprotected as necessary, and as known to those skilled in the art.

As used herein, the term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, napthyl, thienyl, and indolyl. As used herein, the term may also include both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, sulfonic acid, sulfate, phosphonic acid, phosphate or phosphonate or mixtures thereof. The substituted moiety may be either protected or unprotected as necessary, as known to those skilled in the art.

According to a first aspect, the present disclosure relates to a cross-linked polymer resin of formula (I)

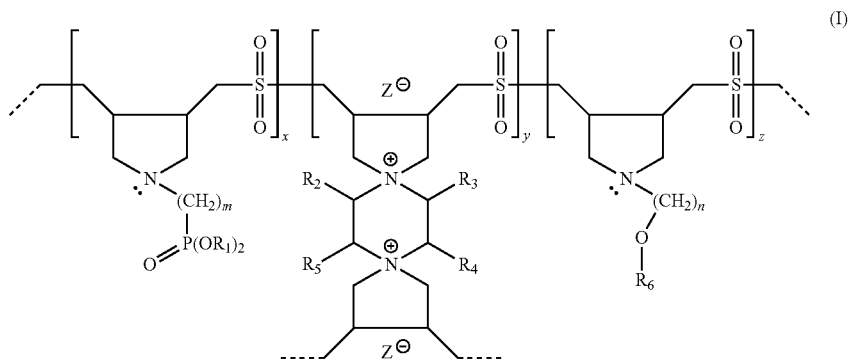

(I)

or a salt, solvate, tautomer, or stereoisomer thereof. Each $R_1$ is —H, a positive counter ion, an optionally substituted alkyl, an optionally substituted cycloalkyl, or an optionally substituted aryl. The substituents $R_2$, $R_3$, $R_4$, and $R_5$ are each independently —H, an optionally substituted alkyl, an optionally substituted cycloalkyl, or an optionally substituted aryl. $R_6$ is an optionally substituted arylalkyl. In the formula, m and n are each independently a whole number in the range of 1-10, and x, y, and z are each independently a whole number greater than zero. $Z^-$ is a counter ion.

In one embodiment, each $R_1$ is —H, a positive counter ion, an optionally substituted alkyl, an optionally substituted cycloalkyl or an optionally substituted aryl. In a preferred embodiment, each $R_1$ is —H or a positive counter ion, most preferably each $R_1$ is —H, Li+, Na+, K+ or some other suitable monocation. In another preferred embodiment, each $R_1$ is —H or Na+.

In one embodiment, $R_2$, $R_3$, $R_4$, and $R_5$ are independently —H, an optionally substituted alkyl, optionally substituted cycloalkyl, or an optionally substituted aryl. In a preferred embodiment, $R_2$, $R_3$, $R_4$, and $R_5$ are independently —H or an optionally substituted $C_1$-$C_6$ alkyl group, such as a methyl group or an optionally substituted ethyl group. In another preferred embodiment, $R_2$, $R_3$, $R_4$, and $R_5$ are independently —H or a halide, most preferably $R_2$, $R_3$, $R_4$, and $R_5$ are each —H.

As mentioned previously, $R_6$ is an optionally substituted arylalkyl. $R_6$ may be phenyl, biphenyl, napthyl, thienyl, indolyl, or some other benzene derivative, aromatic hydrocarbon, neutral homocyclic, heterocyclic aromatic, fused aromatic, or polycyclic, with or without substituted groups.

In a preferred embodiment, m and n are each independently a whole number in the range of 1-10. More preferably, m is in the range 1-5, preferably 1-4. Even more preferably, m is 1 or 3. Preferably, n is 3-10, preferably 4-8, most preferably 6. In one embodiment, the value of m and n denote a straight alkyl chain of $CH_2$ groups, and either or both of these alkyl chain moieties may be optionally substituted as described herein.

In a preferred embodiment, x is a whole number greater than zero, preferably x is 1-5,000, preferably 1-2,500, preferably 1-1,000, preferably 1-500, preferably 2-400, preferably 3-300, preferably 4-275, preferably 5-250, preferably 10-200, preferably 15-150, preferably 20-100, preferably 25-50. In a preferred embodiment, y is a whole number greater than zero, preferably y is 1-5,000, preferably 1-2,500, preferably 1-1,000, preferably 1-500, preferably 1-400, preferably 1-300, preferably 1-275, preferably 5-250, preferably 10-200, preferably 15-150, preferably 20-100, preferably 25-50. In a preferred embodiment, z is a whole number greater than zero, preferably z is 1-5,000, preferably 1-2,500, preferably 1-1,000, preferably 1-500, preferably 1-400, preferably 1-300, preferably 1-275, preferably 5-250, preferably 10-200, preferably 15-150, preferably 20-100, preferably 25-50.

In one embodiment, a ratio of x to y is 5:1-10:1, preferably 6:1-8:1, more preferably 6.5:1-7.5:1, or about 7.2:1. However, in some embodiments a ratio of x toy may be less than 5:1 or greater than 10:1.

In one embodiment, a ratio of z to y is 1:1-5:1, preferably 1.2:1-4:1, more preferably 1.5:1-2.5:1, or about 1.8:1. However, in some embodiments a ratio of z toy may be less than 1:1 or greater than 5:1.

In one embodiment, a ratio of x to z is 2:1-8:1, preferably 3:1-7:1, more preferably 3.5:1-4.5:1, or about 4:1. However, in some embodiments a ratio of x to z may be less than 2:1 or greater than 8:1.

In one embodiment, the value of x may be 65-80%, preferably 67-77%, more preferably 70-74% of the sum of x, y, and z. In a preferred embodiment, the value of x may be about 72% of the sum of x, y, and z. However, in some embodiments, the value of x may be less than 65% or greater than 80% of the sum.

In one embodiment, the value of y may be 5-20%, preferably 6-18%, more preferably 8-15% of the sum of x, y, and z. In a preferred embodiment, the value of y may be about 10% of the sum of x, y, and z. However, in some embodiments, the value of y may be less than 5% or greater than 20% of the sum.

In one embodiment, the value of z may be 8-30%, preferably 12-28%, more preferably 14 20% of the sum of x, y, and z. In a preferred embodiment, the value of y may be about 18% of the sum of x, y, and z. However, in some embodiments, the value of y may be less than 8% or greater than 30% of the sum.

In one embodiment, $Z^-$ is a counter ion and may be $F^-$, $Cl^-$, $Br^-$, $I^-$, $NO_3^-$, $OH^-$ or some other suitable monoanion. Preferably $Z^-$ is $OH^-$ or a halide, most preferably $Z^-$ is $Cl^-$. In another embodiment, the pyrrolidine ring moiety cross-linked polymer resin of formula (I) may be optionally substituted as described herein.

The repeating unit x, the repeating unity, and/or the repeating unit z may be repeated in the cross-linked polymer resin of formula (I) from 10-10,000 times, preferably 20 to 5,000 times, more preferably 25 to 2,500 times, more preferably 50 to 1,500 times, more preferably 100 to 1,000 times. In an alternative embodiment, the values for x, y, and/or z may fall outside of these ranges and still provide suitable cross-linked polymer resin of formula (I).

Since a copolymer consists of at least two types of constituent units (structural units), copolymers can be classified based on how these units are arranged along the chain. Alternating copolymers are copolymers consisting of macromolecules comprising two species of monomeric units in a regular alternating sequence. An alternating copolymer may be considered as a homopolymer derived from an implicit or hypothetical monomer. A periodic copolymer is a copolymer which has two species of monomeric units arranged in a repeating sequence. A statistical copolymer is a copolymer in which the sequence of monomeric units follows a statistical rule. Alternatively if the probability of finding a specific monomeric unit at a particular point in the chain is equal to the mole fraction of that monomeric unit in the chain, then the polymer may be referred to as a truly random copolymer. In gradient copolymers the monomer composition changes gradually along the chain. The cross-linked polymer resin of the present disclosure may be an alternating copolymer, a periodic copolymer, a statistical copolymer a random copolymer or mixtures thereof.

Copolymers may also be described in terms of the existence of or arrangement of branches in the polymer structure. Linear copolymers consist of a single main chain whereas branched copolymers consist of a single main chain with one or more polymeric side chains. The cross-linked polymer resin of the present disclosure may be a linear copolymer, a branched copolymer, other special types of branched copolymers including star copolymers, brush copolymers, comb copolymers, and mixtures thereof.

A block copolymer is a specific type of copolymer made up of blocks of different polymerized monomers. In a block copolymer, a portion of the macromolecule comprising many constitutional units has at least one feature which is not present in the adjacent portions. Block copolymers comprise two or more homopolymer subunits linked by covalent bonds. The union of the homopolymer subunits may require an intermediate non-repeating subunit, known as a junction block. Block copolymers with two or three distinct blocks are called diblock copolymers and triblock copolymers respectively, tetrablocks and multiblocks, etc. can also be fabricated. In stereoblock copolymers a special structure can be formed from one monomer where the distinguishing feature is the tacticity of each block. The cross-linked polymer resin of the present disclosure may be a block copolymer, a stereoblock copolymer, or mixtures thereof.

A graft macromolecule refers to a macromolecule with one or more species of block connected to the main chain as side chains, these side chains having constitutional or configurational features that differ from those in the main chain. Graft copolymers are a specific type of branched copolymer in which the side chains are structurally distinct from the main chain. For example, the main chain and side chains may be composed of distinct homopolymers; however, the individual chains of a graft copolymer may be homopolymers or copolymers. Different copolymer sequencing is sufficient to define a structural difference, thus a diblock copolymer with alternating copolymer side chains may be termed a graft copolymer. As with block copolymers, the quasi-composite graft copolymer product has properties of both "components". The cross-linked polymer resin of the present disclosure may be a graft copolymer.

Polymers can be classified based on their tacticity or structure. Tacticity may be defined as the geometric arrangement (orientation) of the characteristic group (side group or side chain) of monomer units or repeating units with respect to the main chain (backbone) of the polymer. An isotactic polymer is the type of polymer in which the characteristic groups are arranged on the same side of the main chain. A syndiotactic polymer is the type of polymer in which the characteristic groups are arranged in an alternating fashion. An atactic polymer is the type of polymer in which the characteristic groups are arranged in irregular fashion (randomness) around the main chain. The cross-linked polymer resin of the present disclosure may be isotactic, syndiotactic, atactic or copolymers and mixtures thereof.

The degree of polymerization (DP) is defined as the number of monomeric units in a macromolecule or polymer. In one embodiment, the cross-linked polymer resin of the present disclosure has a degree of polymerization of 100-2500, preferably 100-1500, preferably 100-750, preferably 100-300. In a preferred embodiment, the cross-linked polymer resin of the present disclosure is produced by free radical polymerization which often results in a wide molecular weight distribution. In one embodiment, the cross-linked polymer resin of the present disclosure has a weight average molecular weight of 5-200 kDa, preferably 10-150 kDa, preferably 10-100 kDa, preferably 10-75 kDa, more preferably 10-50 kDa, preferably 20-35 kDa.

Dispersity is a measure of the heterogeneity of sizes of molecules or particles in a mixture. The polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and can be affected by a variety of reaction conditions such as reactant ratios, how close the polymerization went to completion, etc. Generally, a decreasing molecular weight distribution increases water solubility and increases flexibility; it can further affect properties including crystalizability, adhesion, mechanical strength and diffusivity. In one embodiment, the cross-linked polymer resin of the present disclosure has a PDI of at least 1 and up to 6, preferably up to 5, preferably up to 3, preferably up to 2.5, preferably up to 2, preferably up to 1.5, preferably up to 1.25.

In one embodiment, a compound of formula (I) is porous and has a specific surface area of 40-70 m$^2$/g, preferably 45-65 m$^2$/g, more preferably 50-60 m$^2$/g, even more preferably 54-58 m$^2$/g. Preferably the specific surface area is determined by N$_2$ adsorption-desorption and Brunauer-Emmett-Teller (BET) methods, however, other procedures may be used. In some embodiments, a compound of formula (I) may have a specific surface area of less than 40 m$^2$/g or greater than 70 m$^2$/g.

In one embodiment, a compound of formula (I) may be in the shape of particles having an average width or diameter of 0.5 µm-5 mm, preferably 5 µm-1 mm, more preferably 10 µm-500 µm. However, in some embodiments, a compound of formula (I) may be in the shape of particles having an average width or diameter of less than 0.5 µm or greater than 5 mm.

In one embodiment, a compound of formula (I) in the form of particles may have a spherical or substantially spherical shape (i.e., where the sides are rounded or well-rounded) with a sponge-like (i.e., porous) appearance. As defined here, having a substantially spherical shape means that the distance from the particle centroid (center of mass) to anywhere on the particle outer surface varies by less than 30%, preferably by less than 20%, more preferably by less than 10% of the average distance.

In some embodiments, a portion of the particles may be angular (corners sharp and jagged), angular, sub-angular, or sub-rounded and possess a jagged flake-like morphology.

In one embodiment, particles are monodisperse, having a coefficient of variation or relative standard deviation, expressed as a percentage and defined as the ratio of the particle diameter standard deviation (σ) to the particle diameter mean (µ), multiplied by 100%, of less than 25%, preferably less than 10%, preferably less than 8%, preferably less than 6%, preferably less than 5%. In one embodiment, the particles are monodisperse, having a particle diameter distribution ranging from 80% of the average particle diameter to 120% of the average particle diameter, preferably 85-115%. In another embodiment, the particles are not monodisperse, for instance, they may be considered polydisperse. Here, the coefficient of variation may be greater than 25%, or greater than 37%. In one embodiment, the particles are polydisperse with a particle diameter distribution ranging from 70% of the average particle diameter to 130% of the average particle diameter, preferably ranging from 60-140%, more preferably 50-150%.

In one embodiment, a compound of formula (I) is porous and has an average pore diameter of 4-20 nm, preferably 5-16 nm, more preferably 6-10 nm. However, in some embodiments, the average pore diameter may be smaller than 4 nm or greater than 20 nm.

In one embodiment, a compound of formula (I) may comprise a range of pore diameters, and may comprise both mesopores and micropores. As defined here, mesopores are pores having diameters between 2 and 50 nm; micropores are pores having a diameter of less than 2 nm; and macropores refers to pores having diameters larger than 50 nm. A compound of formula (I) may have a micropore surface area of 5-30 m$^2$/g, preferably 15-25 m$^2$/g; a mesopore surface area of 10-30 m$^2$/g, preferably 18-28 m$^2$/g; a micropore volume of 0.01-0.12 cm$^3$/g, preferably 0.06-0.10 cm$^3$/g; a mesopore volume of 0.40-0.65 cm$^3$/g, preferably 0.45-0.62 cm$^3$/g; and a total pore volume of 0.58-0.75 cm$^3$/g, preferably 0.64-0.70 cm$^3$/g.

In one embodiment, a compound of formula (I) is

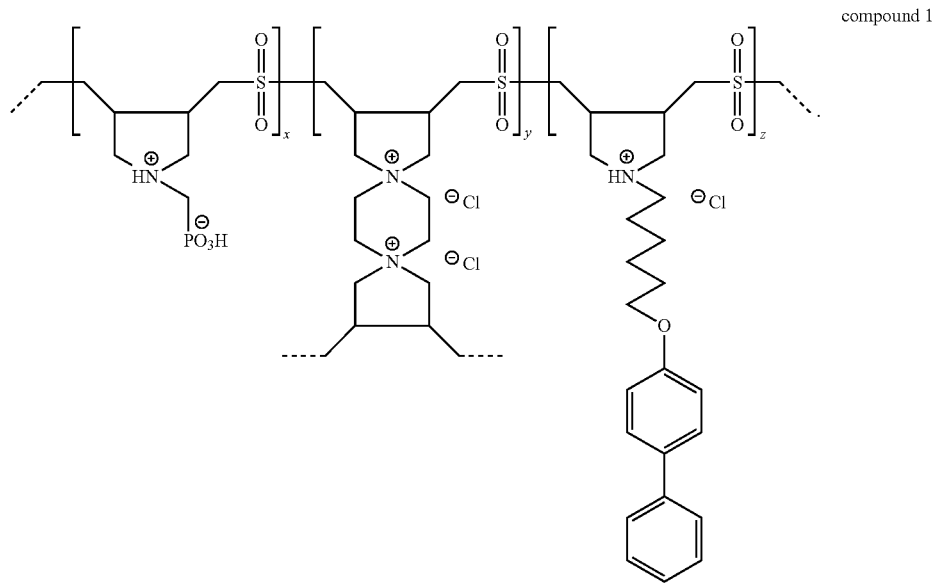

compound 1

In this embodiment, each of $R_1$, $R_2$, $R_3$, $R_4$, and $R_5$ is —H, m is 1, n is 6, x, y, and z are each independently a whole number greater than zero, $Z^-$ is $Cl^-$, and $R_6$ is biphenyl. In one embodiment, x, y, and z are each independently 5-5,000, preferably 20-2,500, more preferably 50-1,000.

In a related embodiment, a compound of formula (I) may be substantially similar to the above compound 1 except that m is 3.

In one embodiment, a compound of formula (I) is

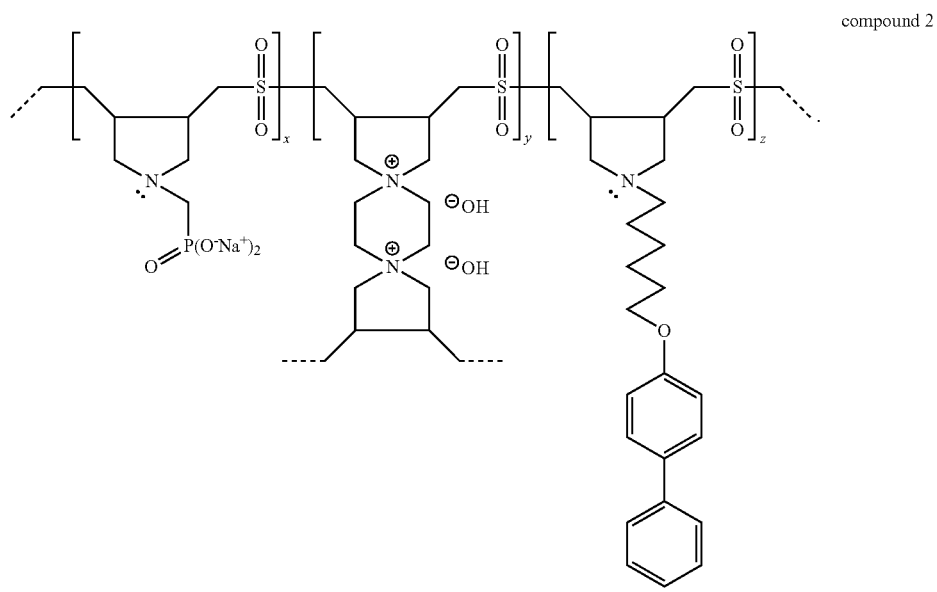

compound 2

In this embodiment, each of $R_1$ is $Na^+$, each of $R_1$, $R_2$, $R_3$, $R_4$, and $R_5$ is —H, m is 1, n is 6, x, y, and z are each independently a whole number greater than zero, $Z^-$ is $OH^-$, and $R_6$ is biphenyl. In one embodiment, x, y, and z are each independently 5-5,000, preferably 20-2,500, more preferably 50-1,000.

In a related embodiment, a compound of formula (I) may be substantially similar to the above compound 2 except that m is 3.

According to a second aspect, the present disclosure relates to a method for producing the cross-linked polymer resin of the first aspect. This method involves reacting an aryloxy halide with a diallylamine to form a hydrophobic pendant monomer; and cyclocopolymerizing the hydrophobic pendant monomer with a N,N-diallyl aminoalkylphosphonate monomer, a tetraallylpiperazinium cross-linking monomer, dissolved sulfur dioxide, and a free radical initiator in a solvent to form the cross-linked polymer resin.

The first step of the method involves producing a hydrophobic pendant monomer by the reaction of an aryloxy halide with a diallylamine. In one embodiment, the aryloxy halide may comprise an optionally substituted arylalkyl as mentioned previously for $R_6$ of formula (I), with a halide such as $F^-$, $Cl^-$, $Br^-$, and/or $I^-$. In a preferred embodiment, the halide is $Cl^-$ or $Br^-$, preferably $Br^-$. In a preferred embodiment, the arylalkyl comprises at least two cyclic aromatic rings. In one embodiment, the aryloxy halide is 4-(6-bromohexyloxy)biphenyl (Ph-PhO(CH$_2$)$_6$Br) or 4-(6-chlorohexyloxy)biphenyl (Ph-PhO(CH$_2$)$_6$Cl). Preferably the aryloxy halide is 4-(6-bromohexyloxy)biphenyl. In one embodiment, the diallylamine may be optionally substituted, as previously mentioned. In an alternative embodiment the hydrophobic pendant monomer may comprise an arylalkyl group but no alkoxy group.

The aryloxy halide and diallylamine may be reacted in a solvent by heating at 70-130° C., preferably 80-120° C., more preferably 90-110° C., or about 100° C. in an oxygen-free environment (i.e. under $N_2$ or Ar gas, preferably $N_2$) for 6-48 h, preferably 12-36 h, more preferably about 24 h.

As used herein, the term "solvent" refers to and includes, but is not limited to, water (e.g. tap water, distilled water, deionized water, deionized distilled water), organic solvents, such as ethers (e.g. diethyl ether, tetrahydrofuran, 1,4-dioxane, tetrahydropyran, t-butyl methyl ether, cyclopentyl methyl ether, di-iso-propyl ether), glycol ethers (e.g. 1,2-dimethoxyethane, diglyme, triglyme), alcohols (e.g. methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, α,α,α-trifluoromethylbenzene, fluorobenzene), chlorinated solvents (e.g. chlorobenzene, dichloromethane, 1,2-dichloroethane, 1,1-dichloroethane, chloroform), ester solvents (e.g. ethyl acetate, propyl acetate), amide solvents (e.g. dimethylformamide, dimethylacetamide, N-methyl-2-pyrrolidone), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, and mixtures thereof. As used herein solvent may refer to non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide) and polar protic solvents (e.g. acetic acid, n-butanol, isopropanol, n-propanol, ethanol, methanol, formic acid, water) and mixtures thereof.

The water used as a solvent or for other purposes may be tap water, distilled water, bidistilled water, deionized water, deionized distilled water, reverse osmosis water, and/or some other water. In one embodiment the water is bidistilled or treated with reverse osmosis to eliminate trace metals. Preferably the water is bidistilled, deionized, deionized distilled, or reverse osmosis water, and at 25° C. has a conductivity of less than 10 μS·cm$^{-1}$, preferably less than 1 μS·cm$^{-1}$; a resistivity of greater than 0.1 MΩ·cm, preferably greater than 1 MΩ·cm, more preferably greater than 10 MΩ·cm; a total solid concentration of less than 5 mg/kg, preferably less than 1 mg/kg; and a total organic carbon concentration of less than 1000 μg/L, preferably less than 200 μg/L, more preferably less than 50 μg/L.

The aryloxy halide and diallylamine may be reacted in a solvent that is a non-polar and/or aromatic solvent, including, but not limited to hexane, benzene, toluene, diethyl ether, chloroform, 1,4-dioxane, xylene (o-xylene, m-xylene, and/or p-xylene), mesitylene, anisole, 1,2-dimethoxybenzene, α,α,α-trifluoromethylbenzene, or fluorobenzene. Preferably the solvent is toluene. The solvent may comprise 60-80 wt %, preferably 65-78 wt % of the aryloxy halide relative to a total weight of the solvent. However, in other embodiments, the solvent may comprise less than 60 wt % or greater than 80 wt % of the aryloxy halide. A mass ratio of the diallylamine to the solvent may be 1.0:1-2.0:1, preferably 1.1:1-1.5:1, or about 1.13:1, though in some embodiments, the mass of the solvent may be greater than the mass of the diallylamine. A molar ratio of the diallylamine to the aryloxy halide may be 1:1-10:1, preferably 2:1-8:1, more preferably 4:1-6:1, or about 5:1.

Following the reaction of the aryloxy halide and diallylamine, the reaction mixture may be mixed with an additional solvent such as any of those previously listed, or diethyl ether, tetrahydrofuran, 1,4-dioxane, tetrahydropyran, t-butyl methyl ether, cyclopentyl methyl ether, and/or di-iso-propyl ether. Preferably the additional solvent is diethyl ether. Preferably the additional solvent added to the reaction mixture has a volume that is greater by a factor of 2-15, preferably 5-12, or about 10. After this, a base may be added such as NaOH or KOH to wash the product. The product may subsequently be dried, concentrated, and purified. In one embodiment, the product may be purified using a packed bed of silica gel as a chromatography medium with non-polar solvents as an eluent. This purified product is the hydrophobic pendant monomer.

In one embodiment, the hydrophobic pendant monomer has a structure of formula (IV)

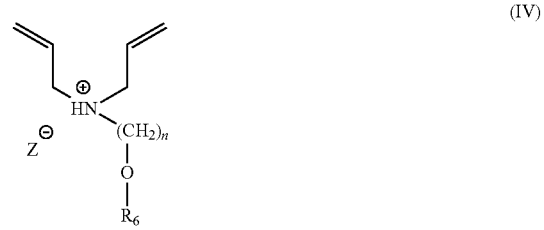

(IV)

or a salt, solvate, tautomer, or stereoisomer thereof, where $R_6$ is an optionally substituted arylalkyl, as mentioned previously for $R_6$ of formula (I). Here, n is a whole number in the range of 1-10, preferably 2-8, more preferably 3-7, however, in some embodiments, n may be a whole number greater than 10. Here, $Z^-$ is a counter ion, such as $F^-$, $Cl^-$, $Br^-$, $I^-$, $NO_3^-$, $OH^-$ or other suitable monoanion. Preferably $Z^-$ is a halide, even more preferably $Z^-$ is $Cl^-$.

In a further embodiment, the hydrophobic pendant monomer compound of formula (IV) is

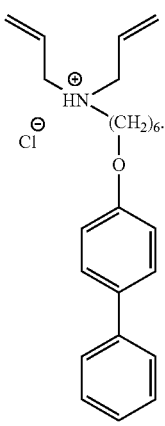

compound 4

In this embodiment, $R_6$ is biphenyl, $Z^-$ is $Cl^-$, and n is 6. This compound may be referred to as 4-(6-hexyloxybiphenyl) diallylamine dichloride.

As mentioned previously, the method involves cyclocopolymerizing the hydrophobic pendant monomer with a N,N-diallyl aminoalkylphosphonate monomer, a tetraallylpiperazinium cross-linking monomer, dissolved sulfur dioxide, and a free radical initiator in a solvent to form the cross-linked polymer resin.

In one embodiment, the N,N-diallyl aminoalkylphosphonate monomer has a structure of formula (II)

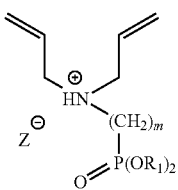

(II)

or a salt, solvate, tautomer, or stereoisomer thereof, where each $R_1$ is —H, a positive counter ion, an optionally substituted alkyl, an optionally substituted cycloalkyl, or an optionally substituted aryl; and m is a whole number in the range of 1-10.

In a further embodiment, the N,N-diallyl aminoalkylphosphonate monomer compound of formula (II) is

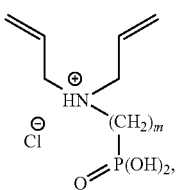

where m is 1 or 3. Here, each $R_1$ is —H, and $Z^-$ is $Cl^-$. In a preferred embodiment, this N,N-diallyl aminoalkylphosphonate monomer compound of formula (II) has m equal to 1, which represents compound 3. In another embodiment of this compound of formula (II), m is 3.

In one embodiment, the tetraallylpiperazinium cross-linking monomer has a structure of formula (III)

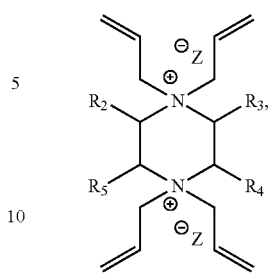

(III)

or a salt, solvate, tautomer or stereoisomer thereof, where $R_2$, $R_3$, $R_4$, and $R_5$ are independently —H, an optionally substituted alkyl, an optionally substituted cycloalkyl, or an optionally substituted aryl, and $Z^-$ is a counter ion. In one embodiment, $R_2$, $R_3$, $R_4$, and $R_5$ are each independently —H or an optionally substituted $C_1$-$C_6$ alkyl group, preferably —H, a methyl group, or an optionally substituted ethyl group, most preferably —H. In another embodiment, $R_2$, $R_3$, $R_4$, and $R_5$ are independently —H or a halide. In one embodiment, $Z^-$ is $F^-$, $Cl^-$, $Br^+$, $I^-$, $NO_3^-$, $OH^-$ or other suitable monoanion, preferably $Z^-$ is a halide, most preferably $Cl^-$.

In a further embodiment, the tetraallylpiperazinium cross-linking monomer compound of formula (III) is

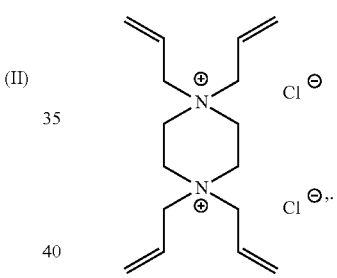

compound 5

Here, $R_2$, $R_3$, $R_4$, and $R_5$ are each —H, and $Z^-$ is $Cl^-$. In this embodiment, compound 5 may be called 1,1,4,4-tetraallylpiperazinium dichloride.

The N,N-diallyl aminoalkylphosphonate monomer, the hydrophobic pendant monomer, the tetraallylpiperazinium cross-linking monomer, and sulfur dioxide are mixed or dissolved in a solvent with a free radical initiator, which altogether makes a cyclocopolymerization reaction mixture. The solvent may be any of those previously mentioned, or polar aprotic solvent including, but no limited to, tetrahydrofuran, ethyl acetate, acetone, dimethylformamide, acetonitrile, dimethyl sulfoxide (DMSO), nitromethane, and propylene carbonate. In some embodiments, a polar protic solvent, a nonpolar solvent, or mixtures thereof may be used. Preferably the solvent is DMSO.

In an alternative embodiment, a polymer may be formed from fewer components, for instance, the hydrophobic pendant monomer, the tetraallylpiperazinium cross-linking monomer, and sulfur dioxide may be mixed with the solvent but without the N,N-diallyl aminoalkylphosphonate monomer. In another embodiment, sulfur dioxide may not be present.

In one embodiment, the cyclocopolymerization reaction mixture may comprise the N,N-diallyl aminoalkylphosphonate monomer at a weight percentage of 5-25 wt %, preferably 8-22 wt %, more preferably 15-19 wt %, or about 17.8 wt %, relative to a total weight of the cyclocopolymerization reaction mixture. However, in some embodiments, the cyclocopolymerization reaction mixture may comprise the N,N-diallyl aminoalkylphosphonate monomer at a weight percentage of less than 5 wt % or greater than 25 wt %.

In one embodiment, the cyclocopolymerization reaction mixture may comprise the hydrophobic pendant monomer at a weight percentage of 1-15 wt %, preferably 3-10 wt %, more preferably 5-9 wt %, or about 7.8 wt %, relative to a total weight of the cyclocopolymerization reaction mixture. However, in some embodiments, the cyclocopolymerization reaction mixture may comprise the hydrophobic pendant monomer at a weight percentage of less than 1 wt % or greater than 15 wt %.

In one embodiment, the cyclocopolymerization reaction mixture may comprise the tetraallylpiperazinium cross-linking monomer at a weight percentage of 0.5-8 wt %, preferably 1-6 wt %, more preferably 2-5 wt %, or about 3.5 wt %, relative to a total weight of the cyclocopolymerization reaction mixture. However, in some embodiments, the cyclocopolymerization reaction mixture may comprise the tetraallylpiperazinium cross-linking monomer at a weight percentage of less than 0.5 wt % or greater than 8 wt %.

In one embodiment, the cyclocopolymerization reaction mixture may comprise the sulfur dioxide at a weight percentage of 1-15 wt %, preferably 3-10 wt %, more preferably 5-9 wt %, or about 7.7 wt %, relative to a total weight of the cyclocopolymerization reaction mixture. However, in some embodiments, the cyclocopolymerization reaction mixture may comprise the sulfur dioxide at a weight percentage of less than 1 wt % or greater than 15 wt %.

In one embodiment, the cyclocopolymerization reaction mixture may comprise the solvent at a weight percentage of 50-70 wt %, preferably 55-65 wt %, more preferably 60-64 wt %, or about 63 wt %, relative to a total weight of the cyclocopolymerization reaction mixture. However, in some embodiments, the cyclocopolymerization reaction mixture may comprise solvent at a weight percentage of less than 50 wt % or greater than 70 wt %.

In one embodiment, the total polymer components added (the total moles of N,N-diallyl aminoalkylphosphonate monomer, moles hydrophobic pendant monomer, moles tetraallylpiperazinium cross-linking monomer, and moles sulfur dioxide) may comprise N,N-diallyl aminoalkylphosphonate monomer at a mole percentage of 25-45 mol %, preferably 30-40 mol %, more preferably 32-36 mol %, or about 34.3 mol %, relative to a total moles of the total polymer components added. However, in some embodiments, the N,N-diallyl aminoalkylphosphonate monomer may be present at a mole percentage of less than 25 mol % or greater than 45 mol %.

In one embodiment, the total polymer components added may comprise the hydrophobic pendant monomer at a mole percentage of 5-20 mol %, preferably 6-15 mol %, even more preferably 7-10 mol %, or about 8.6 mol %, relative to a total moles of the total polymer components added. However, in some embodiments, the hydrophobic pendant monomer may be present at a mole percentage of less than 5 mol % or greater than 20 mol %.

In one embodiment, the total polymer components added may comprise the tetraallylpiperazinium cross-linking monomer at a mole percentage of 1-10 mol %, preferably 2-8 mol %, even more preferably 3-6 mol %, or about 4.8 mol %, relative to a total moles of the total polymer components added. However, in some embodiments, the tetraallylpiperazinium cross-linking monomer may be present at a mole percentage of less than 1 mol % or greater than 10 mol %.

In one embodiment, the total polymer components added may comprise sulfur dioxide at a mole percentage of 40-60 mol %, preferably 45-58 mol %, even more preferably 48-56 mol %, or about 52 mol %, relative to a total moles of the total polymer components added. However, in some embodiments, the sulfur dioxide may be present at a mole percentage of less than 40 mol % or greater than 60 mol %.

An amount of the free radical initiator may be added so that the cyclocopolymerization reaction mixture comprises 0.1-2.0 wt %, preferably 0.5-1.5 wt %, more preferably 0.8-1.2 wt % or about 1 wt % of the free radical initiator relative to a total weight of the cyclocopolymerization reaction mixture. However, in some embodiments, the cyclocopolymerization reaction mixture may comprise less than 0.1 wt % or greater than 2.0 wt % of the free radical initiator.

As used herein a free radical initiator is a substance that can produce radical species under mild conditions and promote radical reactions. These substances generally possess weak bonds that have small bond dissociation energies and are often used in industrial processes such as polymer synthesis. Typical examples of radical initiators are halogen molecules, azo compounds and organic and inorganic peroxides. Halogens undergo the hemolytic fission relatively easily (i.e. chlorine gives to chlorine radicals (Cl.) by irradiation with ultraviolet light). Azo compounds (R—N═N—R') can be the precursor of two carbon centered radicals (R. and R'.) and nitrogen gas upon heating and/or by irradiation. Exemplary azo compound radical initiators include, but are not limited to, azobisisobutyronitrile (AIBN), 1,1'-azobis(cyclohexanecarbonitrile) (ABCN), 4,4'-azobis(4-cyanovaleric acid), 2,2'-azobis(2-methylpropionamidine) dihydrochloride, and 2,2'-azobis(2-methylpropionitrile). AIBN and ABCN yield isobutryonitrile and cyclohexanecarbonitrile radicals.

Organic peroxides each have a peroxide bond (—O—O—), which is readily cleaved to give two oxygen centered radicals. The oxyl radicals are unstable and believed to be transformed into relatively stable carbon centered radicals. Exemplary organic peroxide radical initiators include, but are not limited to, di-tert-butyl peroxide ($^t$BuOO$^t$Bu), benzoyl peroxide ((PhCOO)$_2$), methyl ethyl ketone peroxide, acetone peroxide, tert-butyl hydroperoxide, tert-butyl peracetate, cumene hydroperoxide, 2,5-Di(tert-butylperoxy)-2,5-dimethyl-3-hexyne, dicumyl peroxide, 2-butanone peroxide, tert-butyl peroxybenzoate, tert-butylperoxy 2-ethylhexyl carbonate, 2,5-bis(tert-butylperoxy)-2,5-dimethylhexane, lauroyl peroxide 1,1-bis(tert-butylperoxy)-3,3,5-trimethylcyclohexane, 2,4-pentanedione peroxide 1,1-bis(tert-butylperoxy)cyclohexane, and 1,1-bis(tert-amylperoxy)cyclohexane. Di-tert-butyl peroxide gives two t-butanoyl radicals ($^t$BuO.) and the radicals become methyl radicals (CH$_3$.) with the loss of acetone, benzoyl peroxide generates benzoyloxyl radicals (PhCOO.) each of which loses carbon dioxide to be converted into a phenyl radical (Ph.).

Inorganic peroxides function analogously to organic peroxides and many polymers are often produced from the alkenes upon initiation with peroxydisulfate salts. In solution, peroxydisulfate dissociates to give sulfate radicals (i.e. $[O_3SO—OSO_3]^{2-} \leftrightarrows 2\,[SO_4]^-$). Exemplary inorganic peroxide radical initiators include, but are not limited to, ammonium persulfate, hydroxymethanesulfinic acid monosodium salt dihydrate, potassium persulfate and sodium persulfate.

In one embodiment, the free radical initiator may be an azo compound radical initiator, such as azobisisobutyronitrile (AIBN), 1,1'-azobis(cyclohexanecarbonitrile) (ABCN), 4,4'-azobis(4-cyanovaleric acid), 2,2'-azobis(2-methylpropionamidine) dihydrochloride, and 2,2'-azobis(2-methylpropionitrile), or some other azo compound radical initiator. In a preferred embodiment, the free radical initiator is 2,2'-azoisobutyronitrile (AIBN).

In one embodiment, the free radical initiator is mixed last to form the cyclocopolymerization reaction mixture, and the cyclocopolymerization reaction mixture is maintained under an inert atmosphere ($N_2$ or Ar gas, preferably $N_2$) with stirring or agitating at 40-80° C., preferably 50-70° C., more preferably 60-68° C., or about 65° C., for 6-48 h, preferably 12-36 h, more preferably 18-30 h, or about 25 h. In one embodiment, the cyclocopolymerization mixture may be cooled to room temperature and opened every 2-10 h, preferably every 4-9 h, or about every 8 h to relieve pressure built up from evolved gas. The product of the cyclocopolymerization mixture is the cross-linked polymer resin of formula (I), and may be in the form of a viscous gel, and may furthermore be white or colorless.

The cross-linked polymer resin may be washed with water and/or a solvent, such as ethanol or acetone, and may be dried under a vacuum for 2-12 h, preferably 4-8 h, or about 6 h at a temperature of 40-80° C., preferably 50-70° C., more preferably 60-68° C., or about 65° C. The cross-linked polymer resin may be produced with a reaction yield of greater than 75%, preferably greater than 78%, more preferably greater than 81%.

In one alternative embodiment, the method of making a cross-linked polymer resin may use a hydrophobic pendant monomer of two or more formulas, a N,N-diallyl aminoalkylphosphonate monomer of two or more formulas, and/or a tetraallylpiperazinium cross-linking monomer of two or more formulas. For instance, the method may use two hydrophobic pendant monomer compounds of formula (IV). The first compound may have $R_6$ as biphenyl, $Z^-$ as $Cl^-$, and n as 6 (i.e. compound 4). The second compound may have $R_6$ as 1-naphthyl, $Z^-$ as $Br^-$, and n as 4. A molar ratio of the first compound to the second compound may be 1:10-10:1, preferably 1:5-5:1, more preferably 1:2-2:1. Similarly, a method may use three types of N,N-diallyl aminoalkylphosphonate monomer compounds of formula (II), where each three has an m of 1, 2, or 3, and the monomers may be mixed in the cyclocopolymerization reaction at equivalent molar ratios or uneven molar ratios.

In one embodiment, the cross-linked polymer resin comprises the monomers of formulas II, III, and IV at random locations and according to the overall molar ratios of the three formulas. However, in some embodiments, one or more monomers of formula II, III, or IV may comprise a large group and/or a long alkane chain substitution that causes steric hindrance to direct bulky monomers away from each other.

In one embodiment, the method further comprises contacting the cross-linked polymer resin with a base to form an expanded cross-linked polymer resin. This contacting with a base may form a polyzwitterion/dianion cross-linked polymer resin (a compound of formula (I), such as compound 2), and each $R_1$ may be a positive counter ion. The contacting can be performed by immersing and agitating the cross-linked polymer resin in an alkaline solution comprising the base. The base may be a strong base (i.e. lithium hydroxide, sodium hydroxide, potassium hydroxide, etc.) or a weak base (i.e. potassium carbonate, ammonium hydroxide, sodium carbonate, calcium carbonate, sodium sulfate), preferably a strong base, most preferably sodium hydroxide (NaOH), preferably a 0.5-1.5 M solution of NaOH, preferably a 0.75-1.25 M solution, preferably a 0.9-1.1 M solution, preferably a 0.95-1.05M solution or a 1.0 M solution of NaOH. In a preferred embodiment, the contacting is performed at a temperature of 0-60° C., preferably 15-50° C., preferably 20-40° C., preferably 20-30° C., more preferably 25° C. or room temperature and has a stirred reaction time of 0.5-6 hr, preferably 1-4 hr, preferably 1-3 hr, preferably 1.5-2.5 hr, or about 2 hr. A mass ratio of the cross-linked polymer resin to the alkaline solution may be 0.01:1-0.50:1, preferably 0.03:1-0.20:1, more preferably 0.09:1-0.12:1 or about 0.10:1.

In one embodiment, the cross-linked polymer resin may be mixed with a series of alkaline solutions to ensure a complete ionic exchange to form the expanded cross-linked polymer resin. The expanded cross-linked polymer resin may be washed and rinsed with water or a non-aqueous solvent, preferably a polar protic solvent, preferably methanol, and dried under vacuum at 50-100° C., preferably 50-80° C., preferably 60-70° C., or about 65° C., preferably until the expanded cross-linked polymer resin reaches a constant weight to form a dried expanded cross-linked polymer resin. In a preferred embodiment, this base contacting to produce an expanded cross-linked polymer resin, and the subsequent rinsing and drying has a yield of greater than 60%, preferably greater than 70%, preferably greater than 80%, more preferably greater than 85%.

The expanded cross-linked polymer resin may be expanded in the sense that repulsion among anionic motifs increases its swelling coefficient beyond that of a cross-linked polymer resin not treated with a base. The swelling coefficient is the ratio of a wet (hydrated) volume of the cross-linked polymer resin to its dry volume. The contacting with a base to form an expanded cross-linked polymer resin may increase this swelling coefficient by a factor of 1.5-5.0, preferably 2.0-4.5, more preferably 2.5-4.0, or about 3.5. In one embodiment, a cross-linked polymer resin having a greater swelling coefficient may have a greater adsorption capacity for certain contaminants. In one embodiment, a cross-linked polymer resin having a greater swelling coefficient and/or having contact with a base may have a lower density.

According to a third aspect, the present disclosure relates to a method of reducing a contaminant concentration from an aqueous solution with the cross-linked polymer resin of the first aspect. This method involves contacting the cross-linked polymer resin with an aqueous solution comprising the contaminant where the cross-linked polymer resin reduces the contaminant concentration by adsorption.

The aqueous solution may be a solution from an ocean, a bay, a river, a lake, a swamp, a pond, a pool, a rain sample, a fountain, a bath, an aquarium, a water treatment plant, a sewage treatment plant, a desalination plant, a manufacturing plant, a chemical plant, a textile plant, a power plant, a gas station, a food processing plant, a restaurant, a dry cleaner, or some other place that may be a source of contaminated water mixtures. In another embodiment, the aqueous solution may be prepared in a laboratory or pilot plant for the purpose of testing contaminant removal. In some embodiments, the aqueous solution may be a brine, or comprise sea water or salt water.

In one embodiment, the aqueous solution may comprise a non-polar liquid phase at a volume percent concentration of 0.5-50%, preferably 2-40%, more preferably 4-30% relative to a total volume of the aqueous solution. The non-polar liquid phase may be emulsified or dispersed throughout the aqueous solution, may float at the top of the aqueous solution, or some combination of both. In another embodiment, the aqueous solution may not contain a non-polar liquid phase.

The contaminant may be present in the aqueous solution at a concentration of 0.5 mg/L-100 mg/L, preferably 0.8 mg/L-40 mg/L, more preferably 1.0 mg/L-30 mg/L, even more preferably 5 mg/L-25 mg/L, or about 20 mg/L. However, in some embodiments, the contaminant may be present in the aqueous solution at a concentration of less than 0.5 mg/L or greater than 100 mg/L.

In one embodiment, the cross-linked polymer resin may be contacted with the aqueous solution by dispersing or mixing the cross-linked polymer resin in a fixed volume of aqueous solution, and then stirring or agitating the aqueous solution to keep the cross-linked polymer resin evenly mixed throughout. In one embodiment, the cross-linked polymer resin is dispersed, stirred, or mixed within the aqueous solution at a concentration of 0.1-5.0 g/L, preferably 0.3-4.0 g/L, more preferably 0.5-3.0 g/L, even more preferably 0.8-2.0 g/L, or about 1.0 g/L. However, in some embodiments, the cross-linked polymer resin may be dispersed within the aqueous solution at a concentration of less than 0.1 g/L or greater than 5.0 g/L. In one embodiment, for the mixing, the cross-linked polymer resin may be stirred in the aqueous solution at a rate of 100-300 rpm, preferably 150-280 rpm, more preferably 200-260 rpm. The stirring may be done with an impeller, a wand, a magnetic stir bar, or by placing a vessel of the aqueous solution on a moving platform.

In one embodiment, the cross-linked polymer resin may not be dispersed or mixed in the aqueous solution but fixed to a solid support, such as a plate or a wire mesh. In one embodiment, the solid support may be planar. The solid support may also be a single piece so that the cross-linked polymer resin may be easily removed from the aqueous solution, or removed from a vessel. In a further embodiment, where the cross-linked polymer resin is attached to a solid support so that it does not disperse, the aqueous solution may be continually flowed over the cross-linked polymer resin. In another related embodiment, the aqueous solution may be intermittently flowed over the cross-linked polymer resin. Alternatively, the cross-linked polymer resin may be dispersed but confined within a volume of wire mesh. In another embodiment, the cross-linked polymer resin may be fixed to a solid support, but dispersed or mixed in the aqueous solution. For example, the cross-linked polymer resin may be attached to magnetic microparticles having diameters of 10-400 μm, preferably 40-200 μm.

In one embodiment, the aqueous solution has a pH of 3-7, preferably 3.5-6.5, more preferably 4.0-6.0, or about 5.0. The pH may be adjusted using the addition of buffer, such as acetate buffer, or acids, such as HCl, by a person having ordinary skill in the art. In some embodiments, however, the aqueous solution may have a pH of lower than 3 or greater than 7. In one embodiment, the cross-linked polymer resin may adsorb more of a certain contaminant at a specific pH range.

In one embodiment, the aqueous solution has a temperature of 18-55° C., preferably 20-50° C., more preferably 22-45° C. In one embodiment, the contaminant adsorption may be sufficiently influenced by the aqueous solution temperature.

In one embodiment, the contaminant is a heavy metal ion or a dye. In one embodiment, the contaminant is a heavy metal ion of a metal selected from the group consisting of Cd, Pb, Cr, Se, Hg, As, Mn, Mo, Ni, Cu, Zn, Ag, Tl, and Sb.

In a further embodiment, the contaminant may be an ion of the metals Cd, Pb, Cr, As, Hg, and/or Se. Preferably where the contaminant is a heavy metal ion, the contaminant has an oxidation state of +3. However, in other embodiments, the metal may have an oxidation state of 0, +1, +2, or +4. In a preferred embodiment, the metal is Cr, or $Cr^{3+}$. In the aqueous solution, $Cr^{3+}$ may be present in the form of $CrOH^{2+}$, $Cr_3(OH)_4^{5+}$, and/or $Cr_2(OH)_2^{4+}$. In another embodiment, the heavy metal ion may be As in any oxidation state, and may be present in the aqueous solution as arsenate, $AsO_4^{3-}$.

In the embodiment where the contaminant is a dye, the dye may be an azin dye, an azo dye, a diarylmethane dye, a fluorescent dye, a food coloring, a fuel dye, an ikat dye, an indigo structured dye, an indophenol dye, a perylene dye, a phenol dye, a quinoline dye, a rhodamine dye, a solvent dye, a staining dye, a thiazine dye, a thiazole dye, a triarylmethane dye, a vat dye, a violanthrone dye, or some other type of dye. In one embodiment, the dye may be methyl orange, ERIOCHROME black T (sodium 1-[1-hydroxynaphthylazo]-6-nitro-2-naphthol-4-sulfonate), rhodamine B, methyl red, methylene blue, a rhodamine dye, an azo dye, an azin dye, an acid dye, a phenol dye, or some other dye. In a preferred embodiment, the dye is methyl orange and/or ERIOCHROME black T.

In another embodiment, the contaminant may be some other organic compound, such as a pharmaceutical compound, a metabolite, a microbial toxin, an herbicide, a pesticide, or a steroid.

In one embodiment, where the contaminant is a heavy metal ion, the cross-linked polymer resin has an adsorption capacity of 10-100 mg of contaminant per g of the cross-linked polymer resin, preferably 15-80 mg/g, more preferably 20-50 mg/g. However, in some embodiments, the cross-linked polymer resin may have a heavy metal ion adsorption capacity of less than 10 mg/g or greater than 100 mg/g.

In one embodiment, where the contaminant is a dye, the cross-linked polymer resin has an adsorption capacity of 0.1-50 mg of contaminant per g of the cross-linked polymer resin, preferably 0.5-30 mg/g, more preferably 0.8-5 mg/g. However, in some embodiments, the cross-linked polymer resin may have an adsorption capacity of less than 10 mg/g or greater than 100 mg/g.

In one embodiment, the adsorption capacity may depend on the identity of the contaminant. For example, and without limitation, the adsorption capacity of the cross-linked polymer resin towards $Cr^{3+}$ may be higher than that towards $Cu^{2+}$. Similarly, the adsorption capacity of the cross-linked polymer resin towards one dye may be higher than that towards a different dye.

In one embodiment, where the aqueous solution comprises a heavy metal ion, at least 90% of the total mass of the heavy metal ion is removed from the aqueous solution in at least 9 minutes, preferably at least 12 minutes, more preferably at least 15 minutes. In another embodiment, where the aqueous solution comprises a heavy metal ion, in 20 minutes at least 55%, preferably at least 80%, more preferably at least 90%, even more preferably at least 95% of the mass of the heavy metal ion relative to an initial mass is removed from the aqueous solution. In another embodiment, where the aqueous solution comprises a heavy metal ion, in 60 minutes at least 87%, preferably at least 95%, more preferably at least 99%, even more preferably about 100% of the mass of the heavy metal ion relative to an initial mass is removed from the aqueous solution.

In one embodiment, where the aqueous solution comprises a dye, at least 80%, preferably at least 85%, more preferably at least 90%, even more preferably at least 95% of the mass of the dye, in relation to an initial mass, is removed from the solution in 30 minutes. In a related embodiment, where the aqueous solution comprises methyl orange and/or ERIOCHROME Black T, at least 95%, preferably at least 99%, or about 100% of the mass of the dye or dyes is removed from the solution in 30 minutes.

In one embodiment, the aqueous solution may comprise more than one contaminant, and the cross-linked polymer resin may adsorb more than one contaminant simultaneously. For instance, the aqueous solution may comprise a heavy metal ion and a dye having a heavy metal ion to dye mass ratio of 1:100-100:1, preferably 1:50-50:1, more preferably 1:20-20:1, even more preferably 1:5-5:1. Where the aqueous solution comprises more than one contaminant, the cross-linked polymer resin may adsorb the more than one contaminant with different or substantially similar adsorption capacities. In one embodiment, the cross-linked polymer resin may adsorb two or more dyes simultaneously. In another embodiment, the cross-linked polymer resin may adsorb two or more heavy metal ions simultaneously.

Without being bound to any particular hypothesis, the cross-linked polymer resin may adsorb heavy metal ions by chelation of the aminoalkylphosphonate units. In one embodiment, the aminoalkylphosphonate may provide a tridentate ligand through the phosphonate group and the amino. Again, without being bound to any particular hypothesis, the cross-linked polymer resin may adsorb dyes by hydrophobic interaction and $\pi$-$\pi$ stacking from the arylalkyl group of the hydrophobic pendant. For instance, in one embodiment, an arylalkyl comprising a biphenyl group may interact with the aromatic rings of methylene blue through $\pi$-$\pi$ stacking.

In one embodiment, the method further comprises the steps of separating the cross-linked polymer resin from the aqueous solution to produce a recovered cross-linked polymer resin; mixing the recovered cross-linked polymer resin with an acidic solution; removing the acidic solution to produce a cleaned cross-linked polymer resin; and reusing the cleaned cross-linked polymer resin. The cleaned cross-linked polymer resin maintains an adsorption capacity for at least 5 purification cycles.

In one embodiment, the method further comprises removing the cross-linked polymer resin from the aqueous solution to produce a recovered cross-linked polymer resin. The recovered cross-linked polymer resin is mixed with an acidic solution. The acidic solution is dried or otherwise removed to produce a cleaned cross-linked polymer resin. The cleaned cross-linked polymer resin is reused and maintains an adsorption capacity for at least 5 purification cycles.

Preferably in removing the cross-linked polymer resin, all of it may be recovered after each purification cycle, enabling multiple cycles to be repeated with a single batch of cross-linked polymer resin. However, in some embodiments, 0.1-1 mass %, or 1-5 mass %, may be lost with each cycle. Preferably the reuse of the cross-linked polymer resin does not significantly change its morphology or other physical characteristics. The cross-linked polymer resin may be removed from the aqueous solution by filtering, decanting, centrifugation, or some other technique. In addition, where the recovered cross-linked polymer resin is attached to a magnetic support, a magnet may be used.

In one embodiment, the recovered cross-linked polymer resin may be mixed with the acidic solution at a concentration of 1-30 g/L, preferably 5-25 g/L, more preferably 10-20 g/L, though in some embodiments, the concentration may be less than 1 g/L or greater than 30 g/L. The mixing may involve techniques of agitating or dispersing, as previously mentioned, and in some embodiments, the acidic solution may be cooled or heated. Alternatively, the recovered cross-linked polymer resin and acidic solution may first be mixed, and then left to sit without agitation.

In one embodiment, the acidic solution comprises one or more inorganic acids at a total concentration of 0.05-0.5 M, preferably 0.08-0.3 M, more preferably 0.09-0.11 M, or about 0.10 M. However, in some embodiments, the acidic solution may comprise the inorganic acids at a total concentration of less than 0.05 M or greater than 0.5 M. The inorganic acid may be nitric acid, sulfuric acid, hydrochloric acid, hydrobromic acid, phosphoric acid, perchloric acid, or some other acid. Where two inorganic acids are used, the inorganic acids may be present in the acidic solution at a mol ratio of 1:10-10:1, preferably 1:5-5:1, more preferably 1:2-2:1. Preferably the inorganic acid is nitric acid. In an alternative embodiment, an organic acid may be used, such as acetic acid, and in another alternative embodiment, the recovered cross-linked polymer resin may be mixed with a basic solution, such as sodium hydroxide.

In one embodiment, mixing the recovered cross-linked polymer resin with the acidic solution enables desorption of the contaminant from the recovered cross-linked polymer resin into the acidic solution. In one embodiment, 20-50 wt %, preferably 25-45 wt %, more preferably 27-40 wt % of the adsorbed contaminant, relative to the initial weight of the adsorbed contaminant, releases from the recovered cross-linked polymer resin and becomes free in the acidic solution after 10-40 minutes, more preferably after 15-35 minutes of mixing. In another embodiment, 60-100 wt %, preferably 65-95 wt %, more preferably 70-90 wt % of the adsorbed contaminant, relative to the initial weight of the adsorbed contaminant, releases from the recovered cross-linked polymer resin and becomes free in the acidic solution after 60-180 minutes, more preferably after 70-120 minutes of mixing. In some embodiments, depending on the type of contaminant, the acidic solution may react with the adsorbed contaminant. In one embodiment, the recovered cross-linked polymer resin is in contact with the acidic solution for 0.5-24 h, preferably 1-12 h, more preferably 3-8 h, or about 6 h. In another embodiment, the recovered cross-linked polymer resin may be stored indefinitely in the acidic solution until needed for reuse.

The recovered cross-linked polymer resin is removed from the acidic solution to produce a cleaned cross-linked polymer resin. Here, this step is equivalent to removing the acidic solution, or separating the acidic solution from the recovered cross-linked polymer resin. Preferably the recovered cross-linked polymer resin is removed from the acidic solution in any means similar to those previously mentioned for removing filtering, decanting, centrifugation, or some other technique from solutions. In one embodiment, the cross-linked polymer resin may be removed from the acidic solution by drying the acidic solution, for instance, by using a rotary evaporator. In another embodiment, the cross-linked polymer resin may be rinsed with water or a solvent and then dried. In addition, where the cross-linked polymer resin is attached to a magnetic support, a magnet may be used to remove the cross-linked polymer resin from the acidic solution. In another embodiment, a base may be added to the acidic solution to neutralize the solution before removing the cross-linked polymer resin. Preferably the cleaned cross-linked polymer resin is rinsed or washed in a manner similar to that described previously.

In an alternative embodiment, the cross-linked polymer resin may be fixed to a support and exposed to a flowing aqueous solution, where the cross-linked polymer resin then adsorbs a contaminant. The used cross-linked polymer resin may then be cleaned in place and optionally dried while staying fixed to the support. Alternatively, the nanostructured material may not be fixed to a support, but confined within a permeable membrane or filter, allowing similar operation.

In one embodiment, the cleaning of a recovered cross-linked polymer resin may involve electromagnetic radiation, for instance, subjecting the recovered cross-linked polymer resin to UV light. This UV light irradiation may help in degrading organic compounds or microorganisms adhered to the cross-linked polymer resin.

Following the drying, the cleaned cross-linked polymer resin may be reused to adsorb the same or a different contaminant from an aqueous solution, as described in the third aspect of the disclosure. In one embodiment, the cleaned cross-linked polymer resin maintains its adsorption capacity for at least 5 purification cycles. Here, "maintains adsorption capacity" means that the ratio of the maximum adsorbed contaminant mass per mass of cleaned cross-linked polymer resin is at least 70%, preferably at least 80%, more preferably at least 90%, even more preferably at least 96% of its initial value. A purification cycle refers to the adsorption of a contaminant by the cleaned cross-linked polymer resin and the subsequent cleaning of the cross-linked polymer resin to remove a portion or all of the contaminant. Preferably the cleaned cross-linked polymer resin is able to maintain its adsorption capacity across different contaminants. In other embodiments, the cleaned cross-linked polymer resin is able to maintain its adsorption capacity for at least 10 cycles, at least 20 cycles, at least 30 cycles, or even at least 50 cycles. In one embodiment, a recovered cross-linked polymer resin is able to maintain its adsorption capacity without cleaning, for instance, if the recovered cross-linked polymer resin had been previously mixed with low concentrations of a contaminant.

The examples below are intended to further illustrate protocols for preparing, characterizing the cross-linked polymer resin, and uses thereof, and are not intended to limit the scope of the claims. See Ali S. A., Rachman, I. B., and Saleh, T. A., "Simultaneous trapping of Cr(III) and organic dyes by a pH-responsive resin containing zwitterionic aminomethylphosphonate ligands and hydrophobic pendants," Chemical Engineering Journal 330, 663-674 (2017), doi: 10.1016/j.cej.2017.08.003—incorporated herein by reference in its entirety.

Example 1

Experimental
Chemicals and Materials

Stock solutions of analytical grade Cr(III) nitrate (1,000 mg/L), $HNO_3$, HCl, and NaOH were purchased from Sigma-Aldrich, USA. The standard stock solutions were diluted to the predetermined concentrations for the adsorption tests. 2,2'-Azoisobutyronitrile (AIBN) (from Fluka AG) was crystallized from a chloroform-ethanol mixture. Dimethylsulfoxide (DMSO) was purified by drying with $CaH_2$ and distilling at 64-65° C. and 4 mm Hg. Monomer 3 (≈100% purity), was prepared by a modified procedure which avoided silica gel chromatography. See K. Riedelsberger, W. Jaeger, Polymeric aminomethylphosphonic acids-1. Synthesis and properties in solution. *Des. Monomers Polym.* 1 (1998) 387-407, incorporated herein by reference in its entirety. Cross-linker 5 was synthesized using a literature procedure. See S. A. Ali, S. Z. Ahmed, Z. Hamad, Cyclopolymerization studies of diallyl- and tetraallylpiperazinium salts. *J. Appl. Polym. Sci.* 61 91996) 1077-1085, incorporated herein by reference in its entirety. 4-(6-Bromohexyloxy)biphenyl (Ph-PhO$(CH_2)_6$Br) was prepared as described previously. See A. Yamaguchi, A. Yoshizawa, Phase Transition Behaviour of Amphiphilic Supermolecules Possessing a Semiperfluorinated Alkyl Chain, *Mol. Cryst. Liq. Cryst.*, 479, 181-189, 2007, incorporated herein by reference in its entirety. A chromium standard solution (1000 ppm) was used to prepare the diluted solutions of the required concentrations. Millipore water (18.2 MΩ·cm) was used for the adsorption study.

Characterization Techniques and Procedures

Perkin Elmer Elemental Analyzer Series 11 Model 2400 (Waltham, Mass., USA) was used for elemental analysis, while IR analyses were performed on a Thermo Scientific FTIR spectrometer (Nicolet 6700, Thermo Electron Corporation, Madison, Wis., USA) with a deuterated triglycine sulfate detector. The background correction of the spectra was performed by 16 scans with a resolution of 2 $cm^{-1}$. NMR spectra were collected in JEOL LA 500 MHz spectrometers using $CDCl_3$ with tetramethylsilane (TMS) as an internal standard ($^1$H signal at δ 0 ppm), while in $D_2O$, the residual proton HOD signal at δ4.65 ppm and the dioxane $^{13}$C signal at 67.4 ppm were taken as internal and external standards, respectively. The resin's morphology was further examined by scanning electron microscope (SEM). Energy-dispersive X-ray spectroscopy (EDX) fitted with an X-Max detector was used to measure the elemental spectra of the resin.

The thermal stability of the resin was evaluated by thermogravimetric analysis (TGA) with an SDT Q600 thermal analyzer from TA instruments, USA. The temperature was raised at a rate of 10° C./min over a temperature range 20-800° C. using Platinum/Platinum-Rhodium (Type R) thermocouples under air flowing at a rate of 100 mL/min. A thermogravimetric and differential scanning calorimetry (TGA-DSC) thermal analysis was performed on the sample to understand the thermal stability of the adsorbent.

The BET surface area, pore size, and volumes of the samples were measured on a Micromeritics Tristar surface area and porosimetry analyzer (Micromeritics, USA) using liquid $N_2$ adsorption-desorption at −196° C. by the methods of Brunauer-Emmett-Teller (BET) and Barrett-Joyner-Halenda (BJH). Prior to measurement, the samples were degassed at 150° C. for 3 h to remove the presence of impurities or moisture. The contribution of micropore and mesopores was computed from the t-plot method according to Lippens and de Boer. Atomic Absorption Spectroscopy (Thermo Scientific iCE 3000) was employed to monitor the concentration of Cr(III). The concentration of the tested dyes was monitored in a UV-Vis spectrophotometer using optical quartz cuvettes. Inductively Coupled Plasma-Mass Spectrometer (ICP-MS) measurements were employed to analyze real wastewater samples.

Synthesis of Monomer 4

A solution of 4-(6-bromohexyloxy)biphenyl Ph-PhO$(CH_2)_6$Br (3.33 g, 10.0 mmol) and diallylamine (4.9 g, 50 mmol) in toluene (5 mL) was heated under $N_2$ at 100° C. for 24 h. The reaction mixture, taken up in ether (50 mL), was washed with 5% NaOH solution (20 mL). The organic extract was dried using $Na_2SO_4$, concentrated, and purified by chromatography over silica gel using an ether/hexane mixture as eluent to obtain 4-(6-hexyloxybiphenyl)diallylamine (3.0 g, 86%), which on treatment with dry HCl in ether produced monomer 4 as a white solid in quantitative yield.

M.p. 108-110° C.; (Found: C, 74.4; H, 8.4; N, 3.6%. $C_{24}H_{32}ClNO$ requires C, 74.68; H, 8.36; N, 3.63). $\nu_{max}$ (KBr) 3478, 3402, 3327, 3224, 3084, 3029, 2946, 2867, 1653, 1623, 1606, 1518, 1488, 1392, 1289, 1270, 1244, 1194, 1176, 1116, 1043, 1021, 997, 944, 848, 821, 772, 720, and 701 cm$^{-1}$; $\delta_H$ (CDCl$_3$) 1.42 (2H, quint, J 7.3 Hz), 1.53 (2H, quint, J 7.3 Hz), 1.80 (2H, quint, J 6.7 Hz), 1.89 (2H, m), 2.96 (2H, m), 3.63 (4H, m), 3.98 (2H, t, J 6.4 Hz), 5.52 (4H, m), 6.14 (2H, m), 6.95 (2H, d, J 8.6 Hz), 7.29 (1H, t, J 8.3 Hz), 7.41 (2H, t, J 7.6 Hz), 7.52 (2H, d, J 8.8 Hz), 7.54 (2H, d, J 8.3 Hz), 12.48 (1H, s).

Resin Synthesis—Quadripolymerization of Monomers 3, 4, Cross-Linker 5 and SO$_2$ to Hydrophobic Cross-Linked Polyzwitterionic Acid (HCPZA) 1

Sulfur dioxide was absorbed (1.96 g, 30.6 mmol) in a solution of 3 (4.56 g, 20 mmol), 4 (2.00 g, 5.0 mmol), and 5 (0.890 g, 2.78 mmol) in DMSO (16 g) in a RB flask (50 cm$^3$ volume). Initiator AIBN (250 mg) was added under N$_2$, and then the mixture was stirred in the closed flask at 65° C. Within 1 h, the mixture became an immovable transparent gel, and the polymerization was continued at 65° C. for 24 h. The flask was cooled and opened every 8 h to release N$_2$ produced during the decomposition of the initiator. Finally, the white resin was washed with a liberal excess of water and acetone. Resin HCPZA 1 was dried under vacuum at 65° C. for 6 h (7.8 g, 83%). The resin was found to have: C, 39.1; H, 6.3; N, 4.9; S, 11.2. HCPZA 1 containing 3 (72.0 mol %), 4 (18.0 mol %), 5 (10.0 mol %) and SO$_2$ (100 mol %) requires C, 39.63; H, 5.98; N, 5.12; S, 11.72%.

Resin Synthesis—Conversion of HCPZA 1 to Hydrophobic Cross-Linked Dianionic Polyelectrolyte (HCDAPE) 2

Resin 1 (0.50 g, 1.6 mmol) was treated with NaOH (0.18 g, 4.5 mmol) in water (5 mL); after 1 h at room temperature, a mixture of methanol (20 mL) containing NaOH (0.18 g, 4.5 mmol) was added to the gel. After filtering and washing with methanol, the resultant HCDAPE 2 was dried under vacuum for 6 h at 65° C. (0.51 g, 90%).

The resin was found to have: C, 37.2; H, 5.2; N, 4.5; S, 10.3. HCDAPE 2 containing repeating units derived from 3 (72.0 mol %), 4 (18.0 mol %), 5 (10.0 mol %) and SO$_2$ (100 mol %) requires C, 37.52; H, 5.09; N, 4.64; S, 10.63%. $\nu_{max.}$ (KBr) 3420 (v broad), 2093, 1657, 1520, 1486, 1418, 1299, 1123, 1066, 976, 845, 766, and 557 cm$^{-1}$.

Swelling Coefficient

The swelling coefficient is the ratio of the wet volume of the resin to the dry volume. The swelling coefficient was evaluated as follows: resins were properly crushed and a 20- to 30-mesh fraction was used. To a certain volume of the dry resin in a burette, sufficient water was added to cover its level; the equilibrated volume of the wet sample was measured and compared with the volume of the dry resin.

Batch Experiments

Adsorption efficiency was assessed by the batch experiments carried out as follows: 5, 10, and 20 mg of resin 1 were mixed in aqueous Cr(III) solutions (20 mL) and stirred at various periods over a period of 120 min at 298 K. The initial concentration of Cr(III) was varied. The Cr(III) solution was then filtered and analyzed by AAS to quantify the Cr(III) ion uptake. To gain thermodynamic and kinetic data, batch experiments were performed at temperatures of 298, 318, and 338 K.

The binary system experiments were performed using 30 mg of resin 1 in aqueous solution (20 mL) having 1 ppm concentration of each of Cr(III) and dyes. The resultant solutions were analyzed by ICP for Cr (III) ions, while UV-Vis spectrometer was used for the analysis of dye compounds: methyl orange, ERIOCHROME black T, rhodamine B, methyl red, and methylene blue.

The kinetic studies were performed under certain conditions of shaking speed (150 rpm) and pH (5). After the equilibrium, the final concentrations of methyl orange, ERIOCHROME black T, rhodamine B, methyl red, and methylene blue were analyzed using a UV-Vis spectrophotometer, and the Cr(III) concentration was monitored by flame atomic spectroscopy.

Example 2

Data Analysis

The percent removal of Cr(III) at the equilibrium was calculated by the equation:

$$\% \text{ Removal} = \frac{C_0 - C_e}{C_0} \times 100 \quad (1)$$

Adsorption capacities were calculated using the equations:

$$q_e = (C_0 - C_e) \times \frac{V}{m} \quad (2)$$

and $$q_e = (C_0 - C_t) \times \frac{V}{m} \quad (3)$$

In equation (2), the adsorption capacity $q_e$ (mg g$^{-1}$) at equilibrium is the amount of Cr(III) adsorbed per gram of the resin. Meanwhile, in equation (3), the adsorption capacity $q_t$ (mg g$^{-1}$) is the adsorbed Cr(III) (mg) per gram of 1 at time t. $C_o$, $C_e$, and $C_t$ are the Cr(III) concentrations (mg L$^{-1}$) initially, at equilibrium, and at time t, respectively. V (L) and m (g) stand for the solution volume and the mass of the resin, respectively.

Example 3

Synthesis and Characterization

A cyclopolymerization protocol was exploited in the AIBN-initiated quadripolymerization of hydrophilic monomer 3, hydrophobic monomer 4 and cross-linker 5, along with SO$_2$ as the fourth alternating monomer to obtain hydrophobic cross-linked polyzwitterionic acid (HCPZA) 1 in 83% yield (FIG. 1). See S. Kudaibergenov, Jaeger W., Laschewsky A., Polymeric Betaines: Synthesis, Characterization and Application, *Adv. Polym. Sci.* 201 (2006) 157-224; and G. B. Butler, Cyclopolymerization and cyclocopolymerization, Marcel Dekker, New York, 1992, each incorporated herein by reference in their entirety. During the work up, HCl is eliminated to give the zwitterionic aminophosphonate motifs. The composition of the repeating units in the resin matched with the feed ratio of 0.72:0.18:0.10:1.0 for monomers 3:4:5:SO$_2$ as supported by elemental analysis. This elemental analysis indicates a high conversion of the monomers to the resin.

HCPZA 1, upon treatment with NaOH, was converted to HCDAPE 2. Zwitterionic resin 1 and its anionic form 2 were found to have swelling coefficients of 1.8 and 6.3, respectively. The zwitterionic form of a compact coil in 1 is expected to have a lower affinity for adsorption of water, while the anionic form 2 has more expanded conformations owing to the repulsion among negative charges and thus has a greater affinity for solvation. The presence of the hydrophobic units and chelating aminophosphonate ligands in the resin would serve dual purposes: with a single treatment, the removal of organic pollutants and toxic metal ions is possible.

Figure 2:
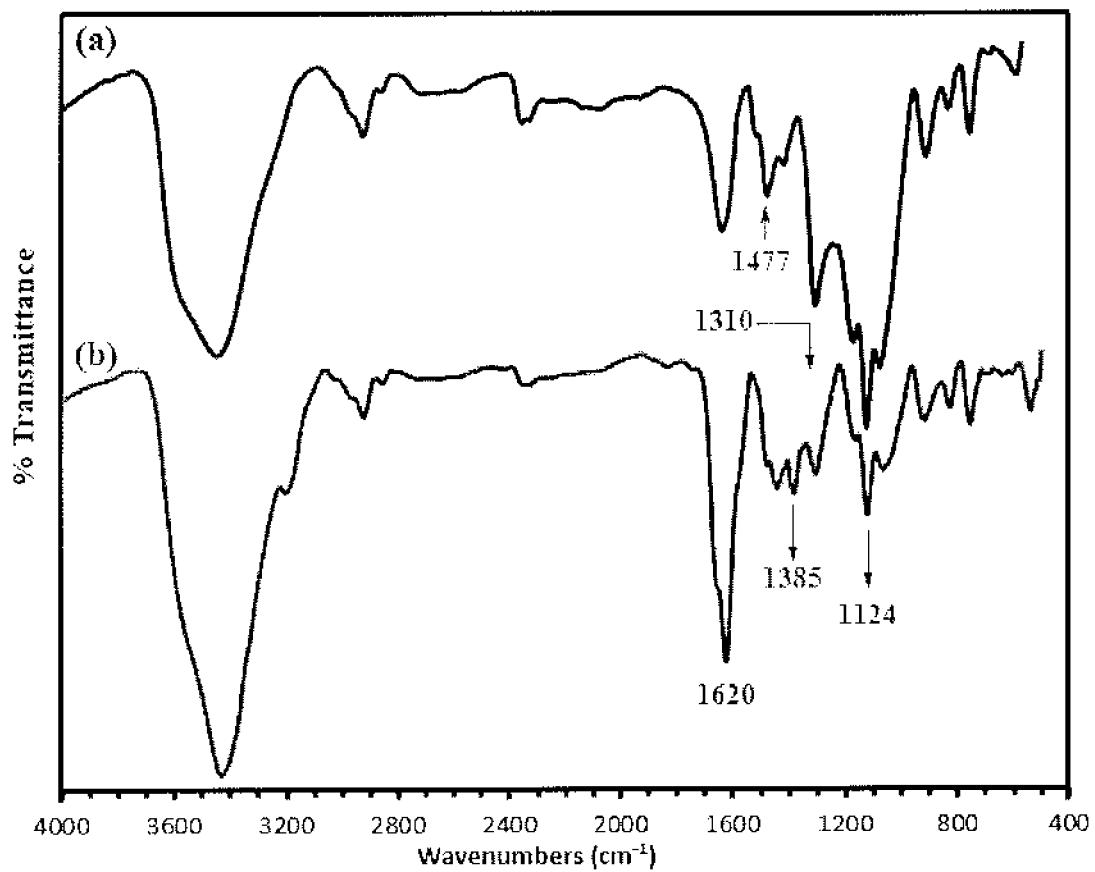
FIG. 2 is a FTIR spectrum of (a) a cross-linked polymer resin compound 1 and (b) a Cr(III)-loaded compound 1.

The FTIR spectra of the resin (a) and Cr(III)-loaded resin (b) are depicted in FIG. 2. The asymmetric and symmetric bands of $SO_2$ appeared at ≈1310 cm$^{-1}$ and ≈1124 cm$^{-1}$, respectively. The bands at the 560-600 cm$^{-1}$ and 1000-1100 cm$^{-1}$ regions can be assigned to phosphonate groups. See H. Martinez-Tapia, Synthesis and Structure of $Na_2[(HO_3PCH_2)_3NH]1.5H_2O$: The First Alkaline Triphosphonate. *J. Solid State Chemistry.* 151 (2000) 122-129, incorporated herein by reference in its entirety. An adsorbed water band is located around 3400 cm$^{-1}$, while the band at 1620 cm$^{-1}$ is assigned to the bending vibration of $H_2O$. The peak at 1477 cm$^{-1}$ is attributed to C—N stretching.

Figure 3:
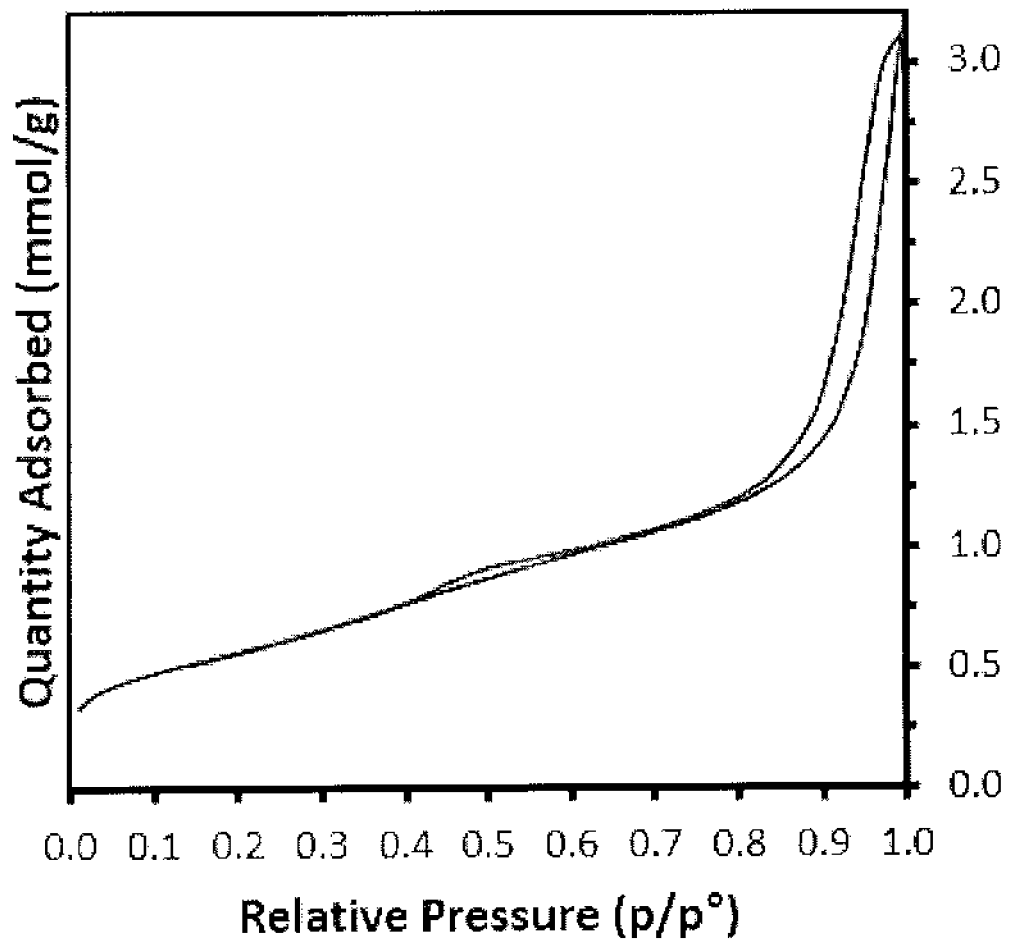
FIG. 3 shows BET adsorption-desorption curves of the cross-linked polymer resin compound 1.

The $N_2$ adsorption-desorption isotherm of the polymer is shown in FIG. 3. The isotherm showed a resemblance of Type I isotherm. The presence of a hysteresis loop at high relative pressure signified the presence of mesopores, while the uptake of nitrogen at low relative pressure confirmed the presence of micropores in the sample. The textural parameters obtained quantitatively are summarized in Table 1. See Y. F. Guo, incorporated herein by reference in its entirety. The resin's surface area of 56 m$^2$/g is relatively high for an ionic resin. See S. D. Alexandratos, incorporated herein by reference in its entirety. The higher surface area may be attributed to the presence of long hydrophobic tail in 1 requiring larger space in the resin matrix.

TABLE 1

Properties of resin 1 obtained from BET surface area analysis

| Textural Parameters | Values |
|---|---|
| BET surface area ($S_{BET}$) | 56 m$^2$·g$^{-1}$ |
| Micropore surface area ($S_{micro}$) | 19 m$^2$·g$^{-1}$ |
| Mesopore surface area ($S_{meso}$) | 23 m$^2$·g$^{-1}$ |
| Total pore volume ($V_t$) | 0.67 cm$^3$·g$^{-1}$ |
| Micropore volume ($V_{micro}$) | 0.08 cm$^3$·g$^{-1}$ |
| Average pore diameter (APD) | 8.3 nm |

Figure 4:
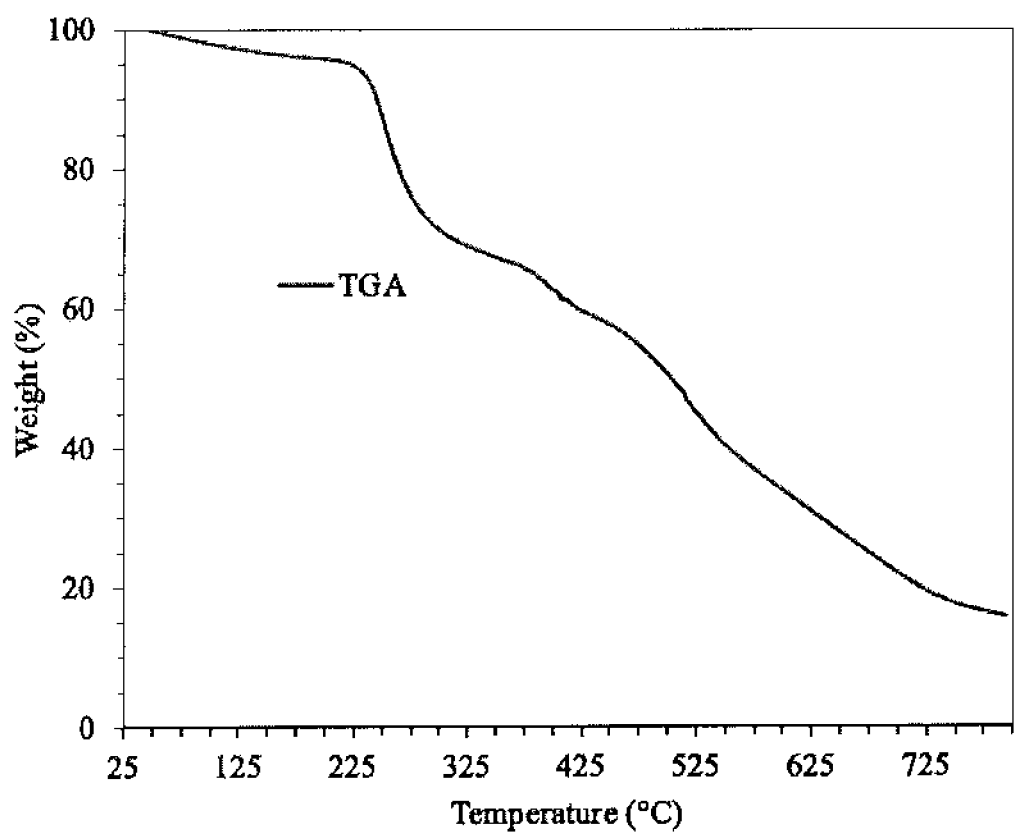
FIG. 4 is a TGA curve of the cross-linked polymer resin compound 1.

The TGA curve of the prepared resin, depicted in FIG. 4, revealed two distinct weight loss stages. The first gradual loss of around 5% from heating up to 225° C. can be assigned to the removal of trapped moisture and HCl from the material. The second steep loss of ≈33% in the range 225-375° C. is assigned to the loss of phosphonate pendants and $SO_2$, owing to polymer degradation. The loss thereafter could be attributed to the combustion of functional groups releasing $NO_x$, $CO_2$, and $H_2O$ gasses. See V. C. G. D. Santos, Highly improved chromium (III) uptake capacity in modified sugarcane bagasse using different chemical treatments. *Quimica Nova.*, 35 (2012) 1606-1611, incorporated herein by reference in its entirety. As seen, the resin remained stable even at 250° C.

Example 4

Evaluation of Adsorption Efficiency
pH-Responsiveness

Figure 5:
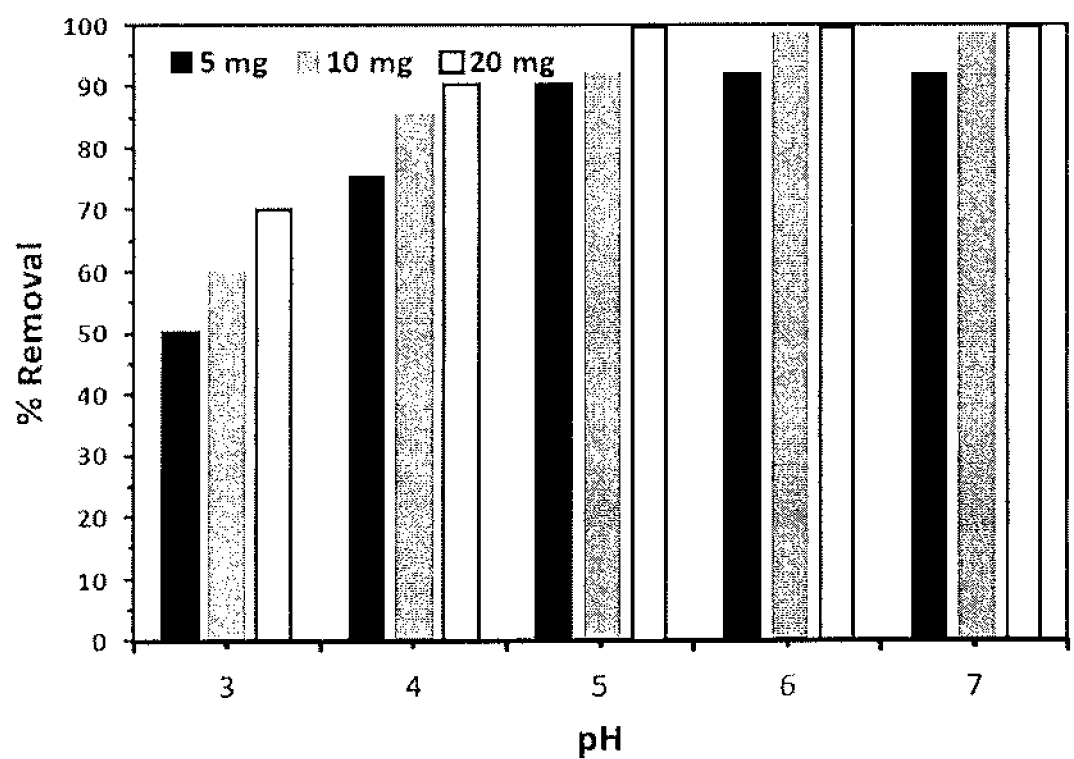
FIG. 5 shows the percentage removal of Cr(III) from 20 mL solutions of 20 ppm Cr(III), with different amounts of the cross-linked polymer resin compound 1 and at different pH levels.

The dependency of the Cr(III) removal on the pH was studied in the pH range 3-7 using dosages of 5, 10, and 20 mg of the resin in 20 mL aqueous mixture, and the results are depicted in FIG. 5. Solutions of pH>7 were not examined to avoid the competition between the adsorption and precipitation of the Cr in form of $Cr(OH)_3$. Note that the pH can affect the nature of the chelating motifs in the resin (FIG. 1). Adsorption of Cr(III) ions increased with the increase in pH in the range 3-7 and the pH value for the highest adsorption was found to be in the range 5-7.

The trend depicted in FIG. 5 is explained by considering the surface charge of the resin. The active sites on the resin play a key role in the removal of Cr(III). At pH>6, chromium is precipitated as chromium hydroxides, while the dominant species in solutions having a pH in the range 1-6 are $CrOH^{2+}$, $Cr_3(OH)_4^{5+}$ and $Cr_2(OH)_2^{4+}$. See T. A. Saleh et al.; J. Ščančar, Milačič R., A critical overview of Cr speciation analysis based on high performance liquid chromatography and spectrometric techniques. *J. Analyt. Atomic Spectrom.* 29 (2014) 427-443, each incorporated herein by reference in their entirety. The positively charged species are attracted to the negative sites ($PO_3H^-$ and $PO_3^{2-}$) on the resin. In the solution of low pH of 3, the hydronium ions effectively compete with the chromium species for the adsorption sites on the resin, thereby decreasing its adsorption capacity.

Contact Time

Figure 6:
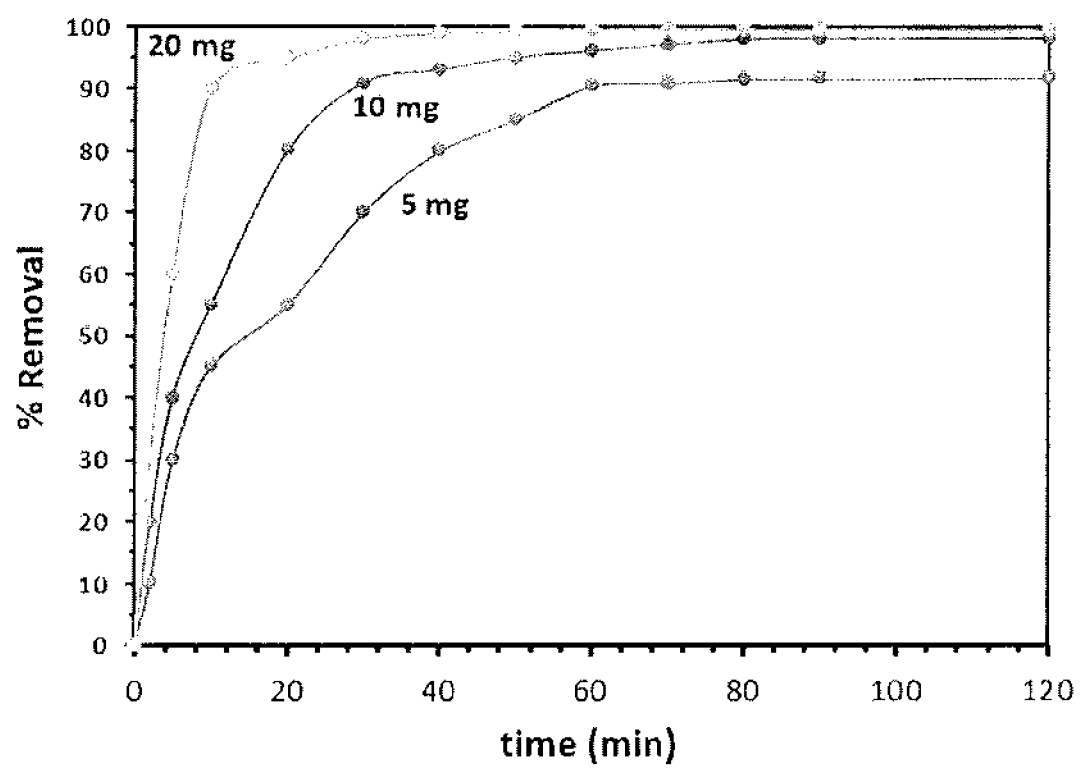
FIG. 6 shows the percentage removal of Cr(III) from 20 mL solutions of 20 ppm Cr(III), with different amounts of the cross-linked polymer resin compound 1 over a 120 minute time period.

The batch experiments with initial concentrations of 5, 10, and 20 ppm Cr(III) (20 mL) were carried out at 25° C. to evaluate the dependence of the adsorption capacity on the contact time. Initially, the rate of adsorption of Cr(III) was fast with steep slopes, while it attained equilibrium adsorption value within 20 min at a resin dosage of 20 mg (FIG. 6).

Kinetics

Figure 7A:
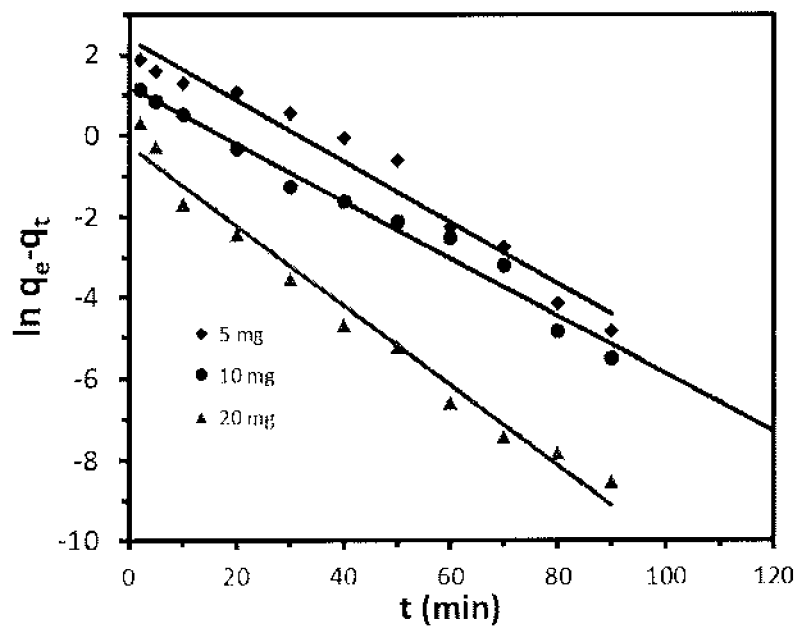
FIG. 7A is a Lagergren's first order plot for Cr(III) adsorption on the cross-linked polymer resin compound 1 at various initial concentrations of compound 1 at 298 K.

Lagergren's first and pseudo-second order kinetic models were applied to examine the adsorption mechanisms. For the first order kinetics, linear equation (4) was used:

$$\ln(q_e-q_t)=\ln q_e-k_1 t \quad (4)$$

where the amounts of Cr(III) (mg/g) adsorbed at t and at equilibrium are described by $q_t$ and $q_e$ respectively, while $k_1$ represents the rate constant. See S. Lagergren, About the theory of so-called adsorption of solution substances. K Sven. *Vetenskapsakad. Handl.* 24 (1898) 1-39, incorporated herein by reference in its entirety. The $\ln(q_e-q_t)$ versus t plot yielded $k_1$ and $q_e$, values (FIG. 7A and Table 2). Disagreement between the experimental ($q_e$, exp) and calculated value ($q_{e, cal}$), and the poor correlation coefficients ($R^2$) ruled out the adsorption rate obeying the first-order kinetic model. The second-order adsorption rate was obtained using:

$$\frac{dq_t}{dt} = k_2(q_e - q_t)^2 \quad (5)$$

where $k_2$ represents the rate constant, and $q_e$ and $q_t$ are the respective adsorption capacities at equilibrium and at time t. See Y. S. Ho, G. McKay, Sorption of dye from aqueous solution by peat. *Chem. Eng. J.* 70 (1998) 115-124, incorporated herein by reference in its entirety.

Figure 7B:
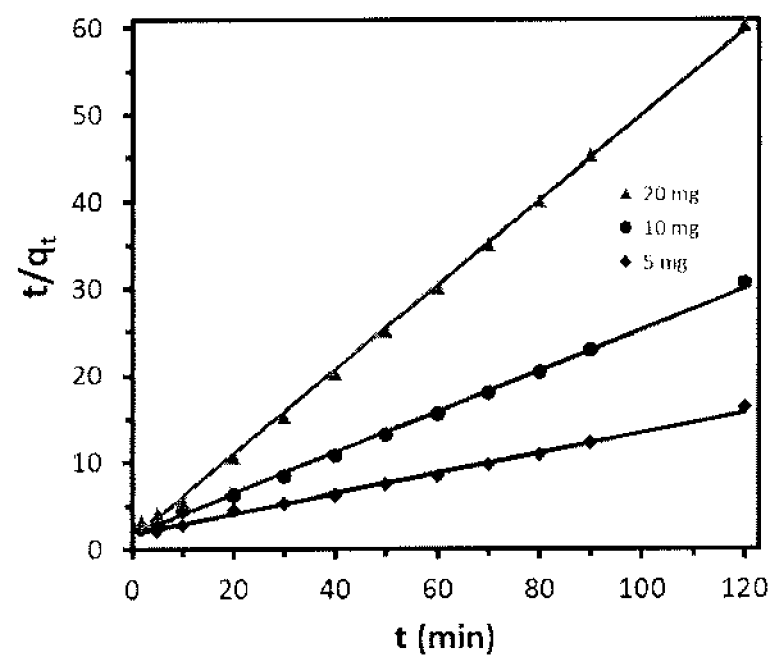
FIG. 7B is a Lagergren's pseudo-second order plot for Cr(III) adsorption on the cross-linked polymer resin compound 1 at various initial concentrations of compound 1 at 298 K.

The pseudo second-order in the linear form is written as:

$$\frac{t}{q_t} = \frac{1}{k_2 q_e^2} + \frac{t}{q_e} \quad (6)$$

where $k_2$ is obtained from $t/q_t$ versus t plot (FIG. 7B). The high correlation coefficient values, and agreement between $q_{e, cal}$ and the $q_{e, exp}$ supported the adsorption process as following the pseudo-second order kinetics model involving predominant chemical interaction between Cr(III) and the chelating ligands (Table 2).

TABLE 2

Kinetic parameters for Cr (III) adsorption on the resin at 298K

| $C_i$ (mg/L) | $q_e$, exp (mg/g) | Lagergren's first order | | | | Pseudo second order | | | Intraparticle diffusion | | |
|---|---|---|---|---|---|---|---|---|---|---|---|
| | | $k_1$ (min−1) | $q_e$, cal (mg/g) | $R^2$ | | $k_2{}^a$ | $q_e$, cal (mg/g) | $R^2$ | $k_{id}{}^b$ | C (mg/g) | $R^2$ |
| 5  | 7.34 | 0.0757 | 11.0 | 0.9646 | | 0.00801 | 8.55 | 0.9983 | 0.881 | 6.87 | 0.9975 |
| 10 | 3.92 | 0.0987 | 3.41 | 0.9778 | | 0.0294  | 4.76 | 0.9988 | 0.650 | 5.89 | 0.9798 |
| 20 | 1.99 | 0.0711 | 3.32 | 0.9796 | | 0.146   | 2.51 | 0.9998 | 0.542 | 2.91 | 0.9896 |

Figure 7C:
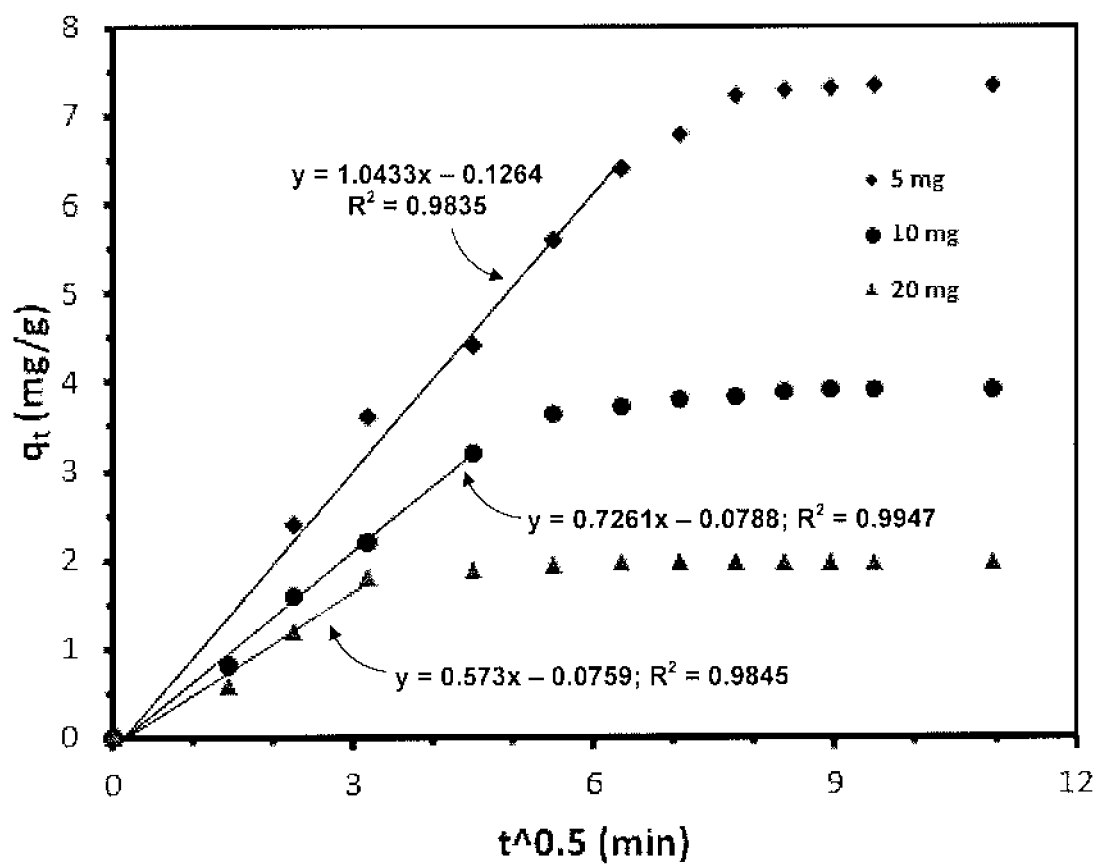
FIG. 7C is an intraparticle diffusion model for Cr(III) adsorption on the cross-linked polymer resin compound 1 at various initial concentrations of compound 1 at 298 K.

The adsorption results were fitted using Weber's intraparticle diffusion model:

$$q_t = k_{id} t^{1/2} + C \qquad (7)$$

where $k_{id}$ (mg/g·min$^{1/2}$) is the constant of the intraparticle diffusion rate, and C is the intercept (mg/g). See W. J. Weber Jr., J. C. Morris, Kinetics of adsorption on carbon from solution, *J. Sanit. Eng. Div. Proceed. Am. Soc. Civil Eng.* 89 (1963) 31-59; I. Langmuir, The adsorption of gases on plane surfaces of glass, mica and platinum. *J. Am. Chem. Soc.* 40 (1918) 1362-1403; T. W. Weber, R. K. Chakravorti, Pore and solid diffusion models for fixed-bed adsorbers. *AIChE J.* 20 (1974) 228-238; H. M. F. Freundlich, Over the Adsorption in Solution, *J. Physic. Chem.* 57, (1906) 385-471; M. I. Tempkin, V. Pyzhev, Kinetics of ammonia synthesis on promoted iron catalyst, *Acta Phys. Chim. USSR* 12 (1940), 327-356; S. K. Sahni, R. V. Bennekom, J. A. Reedijk, spectral study of transition-metal complexes on a chelating ion-exchange resin containing aminophosphonic acid groups. *Polyhedron* 4 (1985) 1643-1658, each incorporated herein by reference in their entirety. The experimental data expressed that initially, the plots of $q_t$ versus $t^{1/2}$ are linear with very good correlation coefficients with the plots passing through the origin (C≈0), thereby implicating intraparticle diffusion as the rate-limiting step. See F. C. Wu, R. L. Tseng, R. S. Juang, Initial behavior of intraparticle diffusion model used in the description of adsorption kinetics. *Chem. Eng. J.* 153 (2009) 1-8; and S. Kocaoba, G. Akcin, Removal and Recovery of Chromium and Chromium Speciation with MINTEQA2, *Talanta*, 57 (2002) 23-30, each incorporated herein by reference in their entirety. It can be discerned from FIG. 7C that the initial linear portion represents the intraparticle diffusion while the plateau represents the equilibrium.

Adsorption Isotherms

Isotherm models provide fundamental physiochemical data to assess adsorption capacity. Langmuir isotherm, the ideal localized monolayer model, is based on the concept of a homogeneous surface phase. It is used to describe the nature of the process as either a physical or chemical one, using the equation:

$$\frac{C_e}{q_e} = \frac{1}{k_L q_m} + \frac{C_e}{q_m} \qquad (8)$$

where $k_L$ (L/mg), $q_m$ (mg/g), $C_e$ (mg/L), and $q_e$ (mg/g) represent the affinity of adsorption sites, the theoretical monolayer adsorption capacity, the equilibrium concentration of Cr(III), and the amount of Cr(III) adsorbed per gram resin, respectively. See I. Langmuir et al., incorporated herein by reference in its entirety.

Figure 8A:
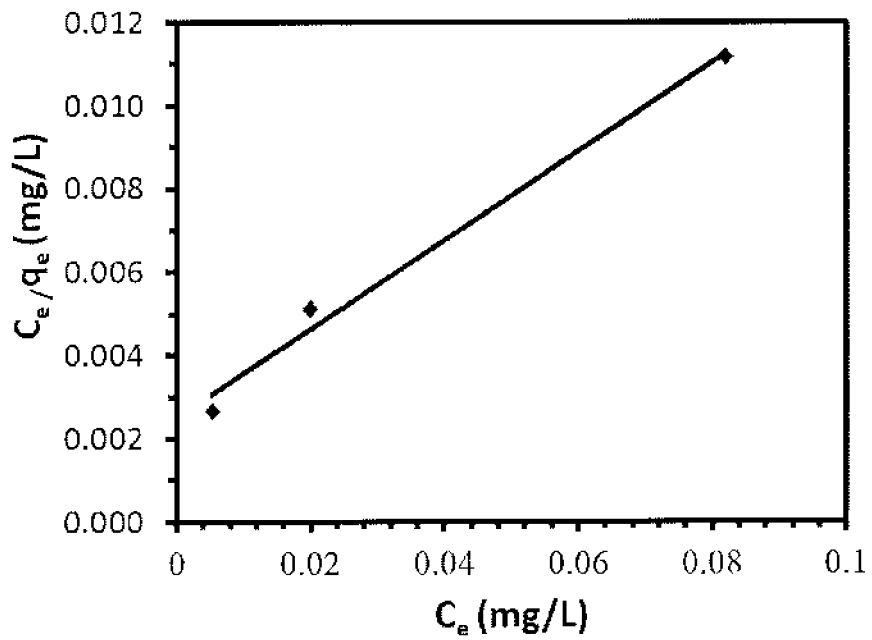
FIG. 8A is a Langmuir adsorption isotherm for Cr(III) adsorption on the cross-linked polymer resin compound 1 in 20 mL solutions having 20 ppm Cr(III) and 20 mg polymer compound 1 at 298 K and pH 5.0.

The plot of $C_e/q_e$ versus $C_e$ is depicted in FIG. 8A, where the slope and intercept give the $k_L$ and Langmuir constant $q_m$, respectively (Table 3). The separation factor represented by the dimensionless equilibrium parameter $R_L$ is introduced in eq (9):

$$R_L = \frac{1}{1 + K_L C_o} \qquad (9)$$

where $C_o$ represents the initial solute concentration. See T. W. Weber et al., incorporated herein by reference in its entirety. The adsorption process becomes unfavorable for $R_L > 1$, linear for $R_L = 1$, favorable for $0 < R_L < 1$, and irreversible when $R_L = 0$. As shown in Table 3, the favorability of the adsorption is confirmed by the $R_L$ value of 0.57. For the sake of comparison, the maximum adsorption capacity ($q_m$) of the current resin and some other sorbents reported for the removal of Cr(III) are tabulated in Table 4; the current resin was found to be more effective than the other sorbents.

TABLE 3

Langmuir, Freundlich, and Temkin isotherm parameters for the adsorption of Cr(III) on resin 1.

| Langmuir | | | | Freundlich | | | | Temkin | | |
|---|---|---|---|---|---|---|---|---|---|---|
| $q_m$ (mg/g) | $k_L$ (L/mg) | $R_L$ | $R^2$ | $1/n$ | $n$ | $k_f$ (mg/g) | $R^2$ | $K_T$ (L/g) | $b_T$ (KJ/mol) | $R^2$ |
| 16 | 40 | 0.57 | 0.9899 | 0.4756 | 2.10 | 24.5 | 0.9984 | 1.006 | 1.29 | 0.9799 |

TABLE 4

Comparison between the efficiency of the resin with literature-reported adsorbents

| Adsorbent | Initial Conc. (mg/L) | pH | Cr(III) removal efficiency | Loading Capacity (mg/g) | Ref. |
|---|---|---|---|---|---|
| Lewatit S: Sulfonic acid group with cross linked polystyrene matrix | 52 | 3.5 | 99 | 20 | * |

TABLE 4-continued

Comparison between the efficiency of the resin
with literature-reported adsorbents

| Adsorbent | Initial Conc. (mg/L) | pH | Cr(III) removal efficiency | Loading Capacity (mg/g) | Ref. |
|---|---|---|---|---|---|
| Amberlite Sulfonic acid group | 10 | 5 | 87 | 2.2 | ** |
| Styrene-DVB | 20 | 5.5 | 68 | 2.5 | *** |
| Coconut shell carbon | 50 | 6 | 87 | 20 | † |
| Sulfonated styrene/acrylonitrile | 30 | 6 | 90 | 7.2 | ‡ |
| Sulfonatedpolymethyl-methacrylate | | | | 9.0 | |
| Polymer | 20 | 5.5 | 99 | 16 | (Current work) |

References:
* F. Gode and E. Pehlivan, Removal of Chromium (III) from Aqueous Solutions Using Lewatit S 100: The Effect of pH, Time, Metal Concentration and Temperature, *J. Hazard. Mater.* 136 (2006) 330-337;
** S. Kocaoba and G. Akcin, Removal of Chromium(III) and Cadmium(II) from Aqueous Solutions, *Desalination*, 180 (2005) 151-156;
*** S. Kocaoba et al;
† G. J. Alaerts et al.;
‡ F. Kanwal et al., each incorporated herein by reference in their entirety.

Figure 8B:
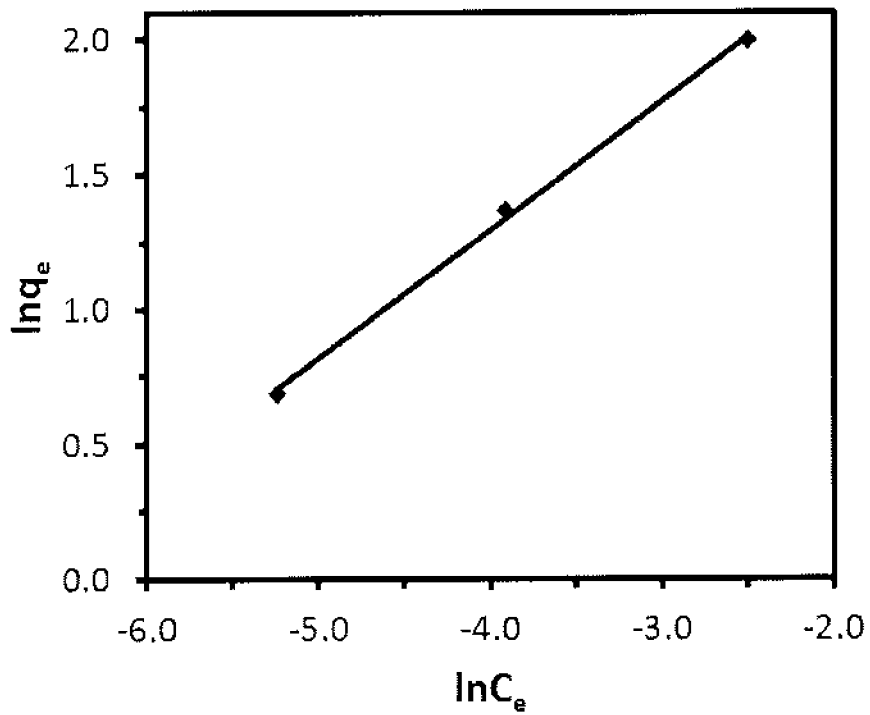
FIG. 8B is a Freundlich adsorption isotherm for Cr(III) adsorption on the cross-linked polymer resin compound 1 in 20 mL solutions having 20 ppm Cr(III) and 20 mg polymer compound 1 at 298 K and pH 5.0.

The Freundlich model describes the adsorption characteristics on heterogeneous surfaces where the adsorbed molecules interact among them and is expressed as:

$$q_e = K_f C_e^{\frac{1}{n}} \tag{10}$$

where Freundlich isotherm constant $K_F$ (mg/g) and $1/n$ indicate the adsorption capacity and intensity, respectively. See H. M. F. Freundlich et al., incorporated herein by reference in its entirety. $C_e$ and $q_e$ describe the concentration (mg/L) of the adsorbate and its amount adsorbed per gram of the adsorbent (mg/g) at equilibrium. The model in linear form is:

$$\ln q_e = \ln K_f + \frac{1}{n}\ln C_e \tag{11}$$

where $K_F$ and n values as calculated from the ln $q_e$ versus ln $C_e$ plot (FIG. 8B) are included in Table 3. The n value is used to describe the nature of the adsorption process: 1/n<1, and 1/n>1, imply a normal and a cooperative adsorption, respectively. The 1/n value of 0.5 in the current work indicates a favorable adsorption process.

Figure 8C:
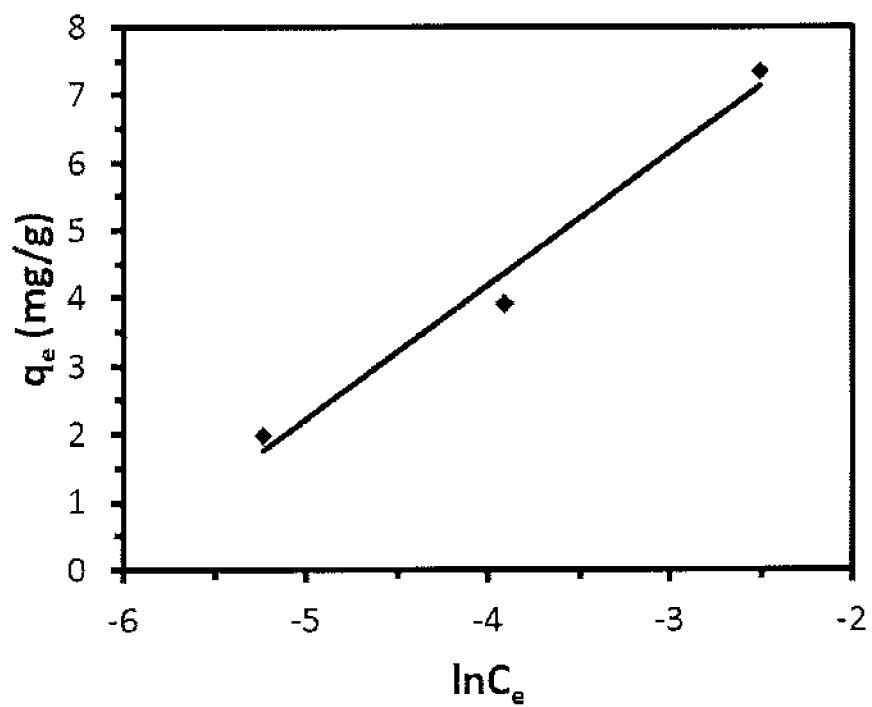
FIG. 8C is a Temkin adsorption isotherm for Cr(III) adsorption on the cross-linked polymer resin compound 1 in 20 mL solutions having 20 ppm Cr(III) and 20 mg polymer compound 1 at 298 K and pH 5.0.
Figure 9A:
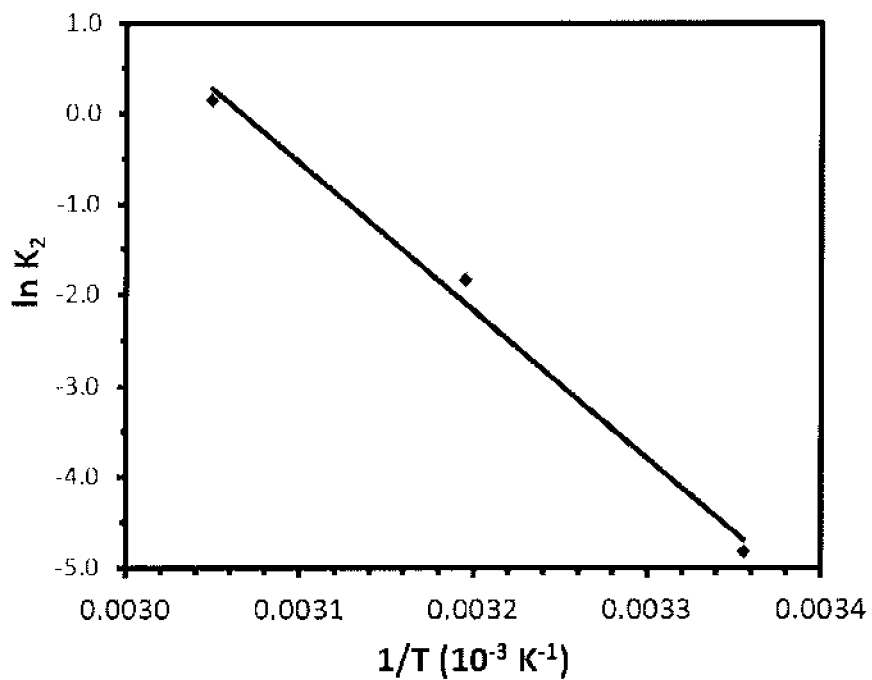
FIG. 9A is an Arrhenius plot of ln $k_2$ versus 1/T for Cr(III) adsorption on the cross-linked polymer resin compound 1 in 20 mL solutions having 20 ppm Cr(III) and 10 mg polymer compound 1 at pH 5.0.
Figure 9B:
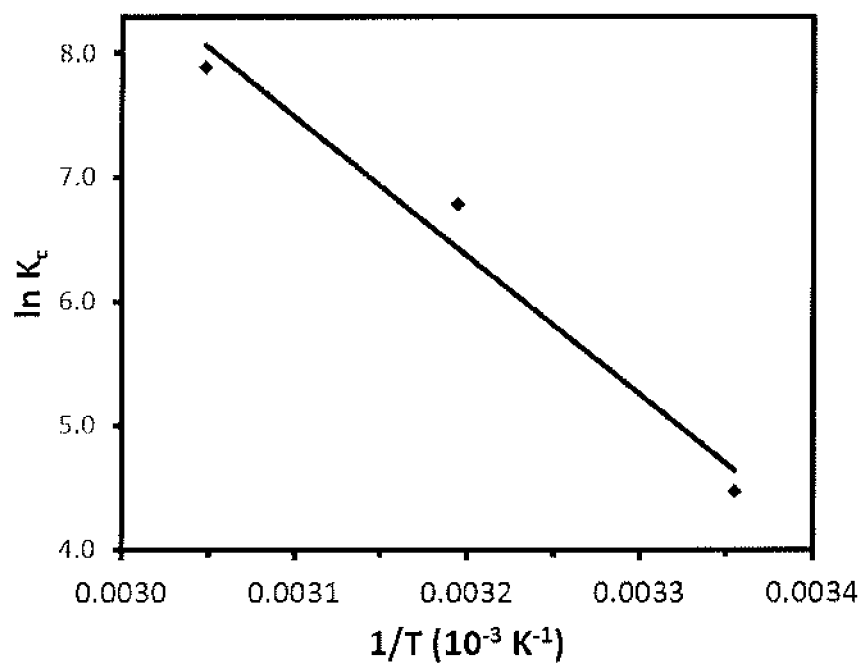
FIG. 9B is a plot of ln $K_c$ versus 1/T for Cr(III) adsorption on the cross-linked polymer resin compound 1 in 20 mL solutions having 20 ppm Cr(III) and 10 mg polymer compound 1 at pH 5.0.
Figure 10A:
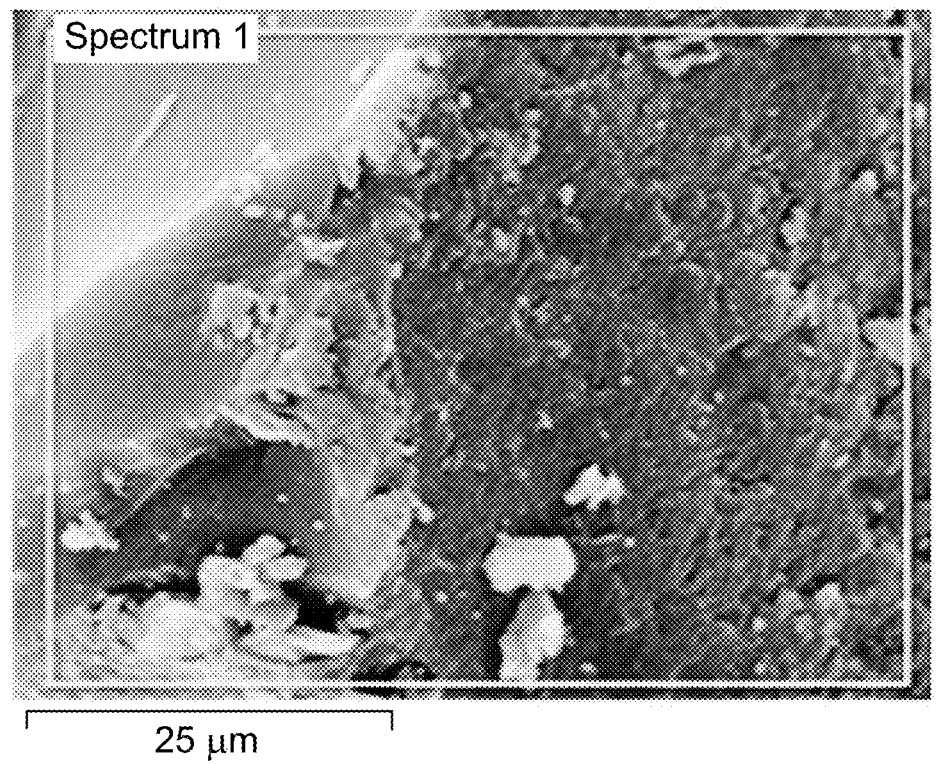
FIG. 10A is a scanning electron microscopy (SEM) image of the cross-linked polymer resin compound 1.
Figure 10B:
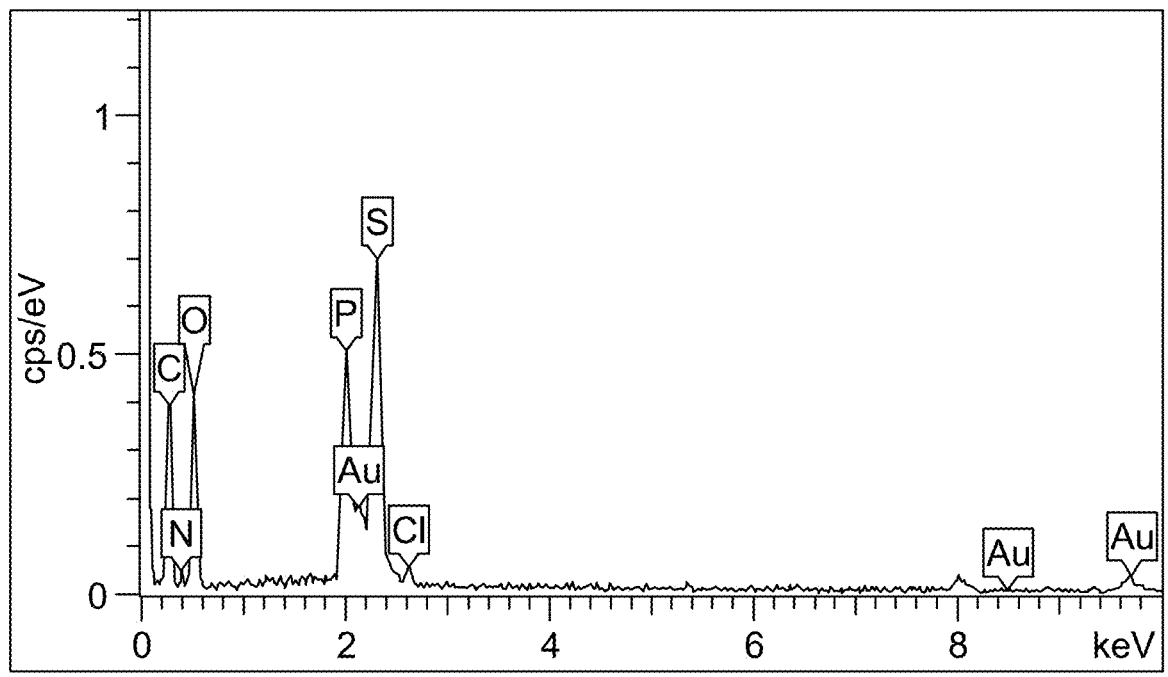
FIG. 10B is an energy dispersive X-ray spectroscopy (EDX) analysis of the cross-linked polymer resin compound 1.

The Temkin model considers the interactions between the adsorbent and adsorbate, and it assumes a linear decrease in the adsorption energy as given by:

$$q_e = \frac{RT}{b_T}\ln K_T + \frac{RT}{b_T}\ln C_e \tag{12}$$

where the Temkin isotherm constant $b_T$ describes the heat of sorption (J mol$^{-1}$), while the Temkin isotherm equilibrium binding constant $k_T$ reflects the maximum binding energy (L/g). See K. Riedelsberger, incorporated herein by reference in its entirety. R and T represent the gas constant (8.314×10$^{-3}$ kJ/mol·K) and temperature (K), respectively. The $q_e$ versus ln $C_e$ plot (FIG. 8C) produced the isotherm constants.

Energy of Activation and Thermodynamics

Using the Arrhenius equation (Eq. (13)) and the related plot (FIG. 8A), the activation energy $E_a$ for the adsorption of $Hg^{2+}$ was determined to be 42.8 kJ/mol which is at the higher end of the range 5-40 kJ/mol, considered as the energy requirement for a physisorption process. The adsorption may not be simply an ion exchange process, in addition, it may involve chemical exchange involving chelation.

$$\log k_2 = -\frac{E_a}{2.303RT} + \text{constant} \tag{13}$$

The thermodynamic parameters $\Delta G°$, $\Delta H°$, and $\Delta S°$ are used to describe the adsorption process. The data were collected using adsorption study at 298, 318, and 338 K with a resin dosage of 10 mg of resin in 20 ppm Cr(III) (20 mL). A plot of ln $K_c$ versus 1/T (FIG. 8B) using the Van't Hoff eq (13) in the linear form gave the $\Delta H°$ and $\Delta S°$ values which were used to compute the $\Delta G°$ using eq (14):

$$\ln K_c = \frac{\Delta S°}{R} - \frac{\Delta H°}{RT} \tag{14}$$

$$\Delta G° = \Delta H° - T\Delta S° \tag{15}$$

The standard thermodynamic equilibrium constant $K_c$ is equated to $q_e/C_e$ (L/mg). See M. I. Tempkin et al.; and S. K. Sahni, each incorporated herein by reference in their entirety. The decrease in $\Delta G°$ values (−3.4, −3.8, and −4.3 kJ/mol) with the increase in temperature and their negative signs reveal the adsorption as a favorable process. The positive $\Delta H°$ value of 26 kJ/mol implies endothermic adsorption. The $\Delta S°$ positive value of 5.9 J/mol·K indicates the affinity of the resin towards Cr(III) with an increase in randomness at the solid-solution interface.

Characterization of the Spent Adsorbent

Figure 11A:
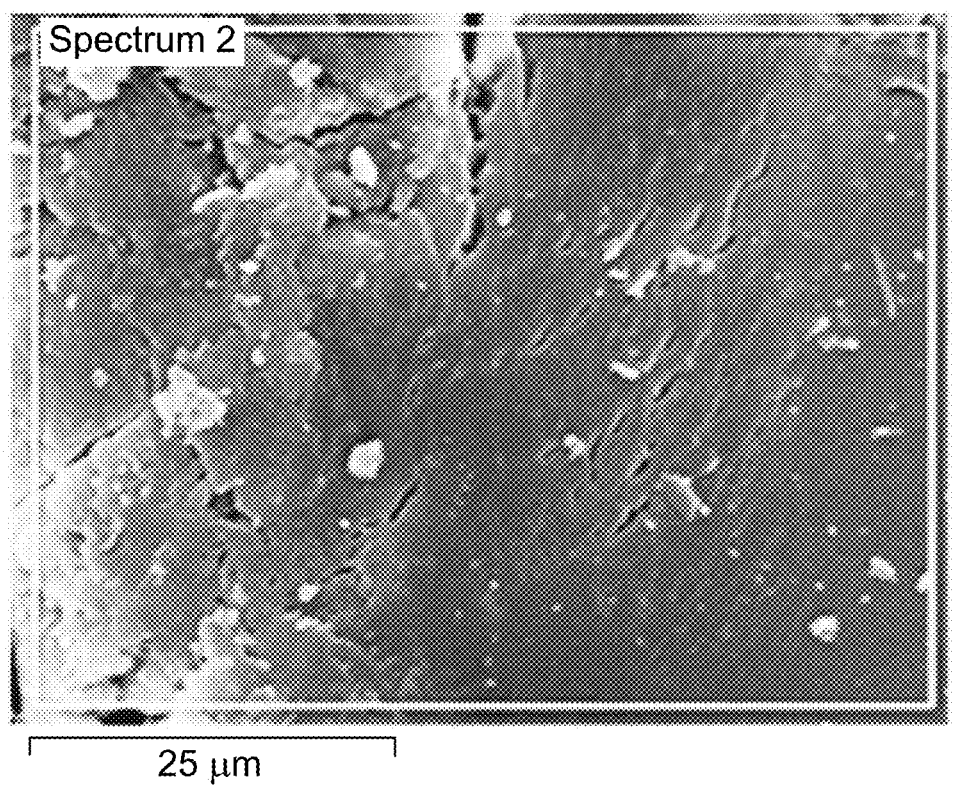
FIG. 11A is a SEM image of the cross-linked polymer resin compound 1 loaded with Cr(III).
Figure 11B:
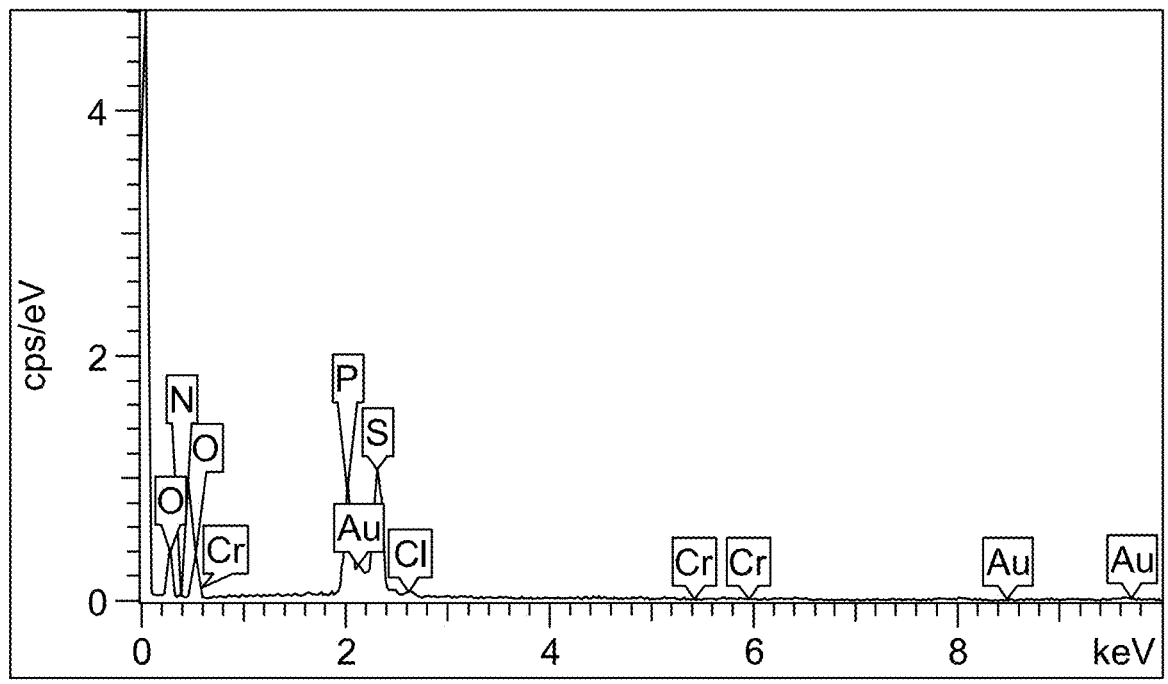
FIG. 11B is an EDX analysis of the cross-linked polymer resin compound 1 loaded with Cr(III).
Figure 12:
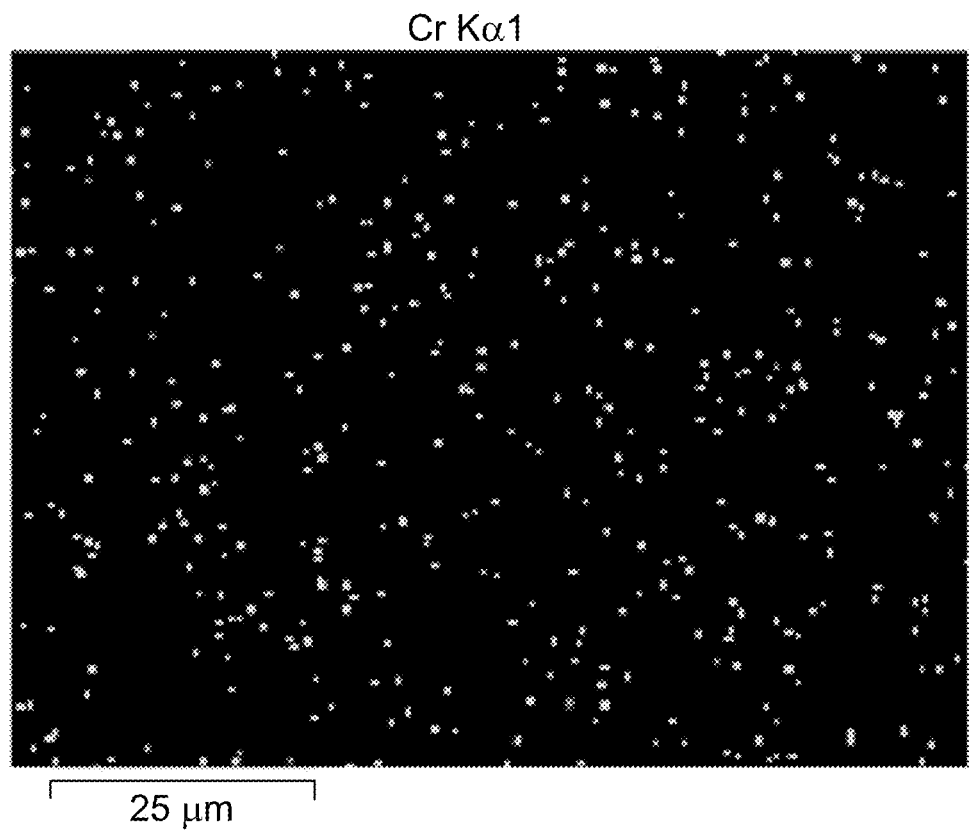
FIG. 12 is a chromium elemental mapping of the cross-linked polymer resin compound 1 loaded with Cr(III).
Figure 13A:
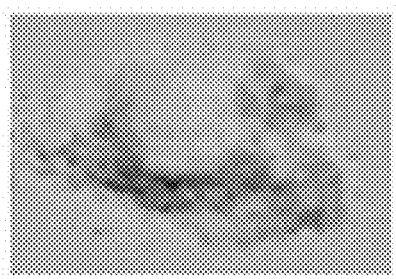
FIG. 13A is a photo of cross-linked polymer resin compound 1 without Cr(III).
Figure 13B:
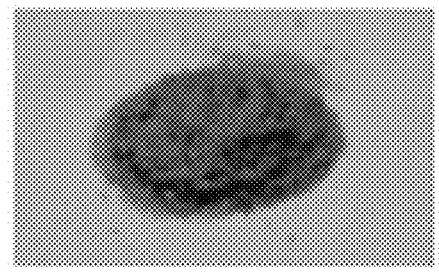
FIG. 13B is a photo of cross-linked polymer resin compound 1 loaded with Cr(III).

The resin's surface morphology and structure were evaluated using a scanning electron microscope (SEM), energy dispersive X-ray (EDX) analyses, elemental mapping, and FTIR spectroscopy. The analysis of the adsorbate loaded resin was conducted using SEM and EDX. After adsorption, the resin was separated. As depicted in FIGS. 11B and 11C, one can notice the presence of the chromium in the EDX spectrum at 0.6, 5.4, and 5.9 keV. The chromium mapping (FIG. 12) gives some indication of the adsorbate distribution on the resin. The data confirm the possible binding of Cr(III) to the surface of the polymer.

The FTIR spectra of resin 1 and Cr(III)-loaded resin 1 are displayed in FIG. 2, (a) and (b) respectively. The shape of the absorption bands of the phosphonate groups are at ≈1100 cm$^{-1}$. The spectrum changes from (a) to (b) in FIG. 2 because of bonding with Cr(III) ions, presumably because of chelation between the phosphonate groups and the chromium ions. The appearances of a new strong band at 1385 cm$^{-1}$ in (b) can be assigned to the presence of nitrate ions, since chromium nitrate was used in the experiments. See S. K. Sahni, R. V. Bennekom, J. Reedijk, A spectral study of transition-metal complexes on a chelating ion-exchange resin containing aminophosphonic acid groups. *Polyhedron.* 4 (1985) 1643-1658, incorporated herein by reference in its entirety. Interestingly, the presence of this band indicates the ability of the polymer to act as an anion exchanger in addition to being a cation exchanger. This is due to the presence of both positive and negative charges in resin 1 at the pH of 5 (FIG. 1).

Example 5

Figure 14:
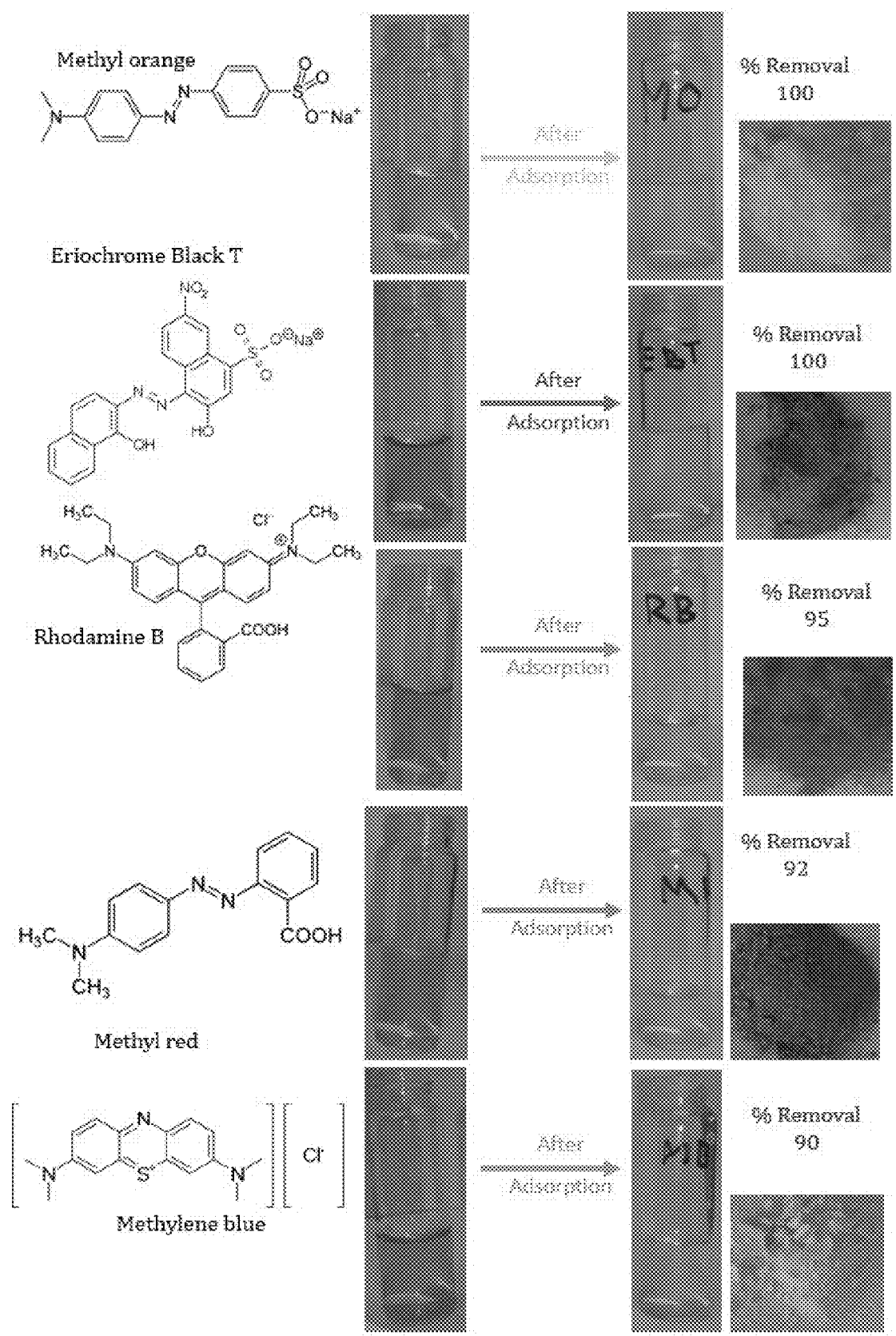
FIG. 14 shows the changes in solutions of different dyes before and after mixing with a cross-linked polymer resin compound 1.

Individual and Simultaneous Removal of Dyes and Metal Ions from Industrial Wastewater Since the resin was designed with hydrophobic branches that can attract the organic pollutants, it was also evaluated for the removal of various dyes (1 ppm each). The resin showed remarkable efficiency in removing methyl orange, ERIOCHROME black T, rhodamine B, methyl red and methylene blue with efficiencies of ≈100%, ≈100%, 95%, 92%, and 90%, respectively, achieved in 30 min. The changes in the color of the dye solutions before and after mixing with the resin are displayed in FIG. 14.

Thus, the results so far encouraged us to investigate the efficacy of the resin with a real sample. Industrial wastewater samples were used to study the effect of the matrix. The sample was spiked with 10,000 µg L$^{-1}$ Cr(III) and 0.1 mM of methyl orange and ERIOCHROME black T, and then treated with the resin. The dye concentrations were analyzed using the UV-vis spectrophotometer. Table 5 presents the analysis of wastewater sample. The % removals are remarkable; the resin captured efficiently not only the metal ions but also arsenate ions, suggesting its efficiency as an anion exchanger.

The regeneration of the used resin was successfully achieved by using 0.1 M HNO$_3$ at room temperature for 6 h. The polymer has demonstrated remarkable efficiency in removing toxic Cr(III) ions from water samples even after 3 cycles with ±4% changes.

TABLE 5

Cr(III) and dye concentrations in wastewater sample before and after the treatment with the resin.

| Metal | Original sample (µg · L$^{-1}$) | Original sample spiked with 10000 (µg · L$^{-1}$) Cr(III) and 1 ppm dyes; then treated with the polymer | Removal (%) |
|---|---|---|---|
| Cr | 8.58 | 76.3 | 99 |
| Pb | 13.28 | 0.08 | 96 |
| Cd | 2.38 | 0.013 | 60 |
| Cu | 652.2 | 258 | 59 |
| As | 4.85 | 0.92 | 81 |
| Mo | 21.20 | 1.27 | 93 |
| Ni | 4.31 | <MDL | ≈100 |
| Methyl orange | 1 ppm | <MDL | ≈100 |
| ERIOCHROME black T | 1 ppm | <MDL | ≈100 |

MDL: the method detection limit

Example 6

Immobilization Mechanism

Figure 15A:
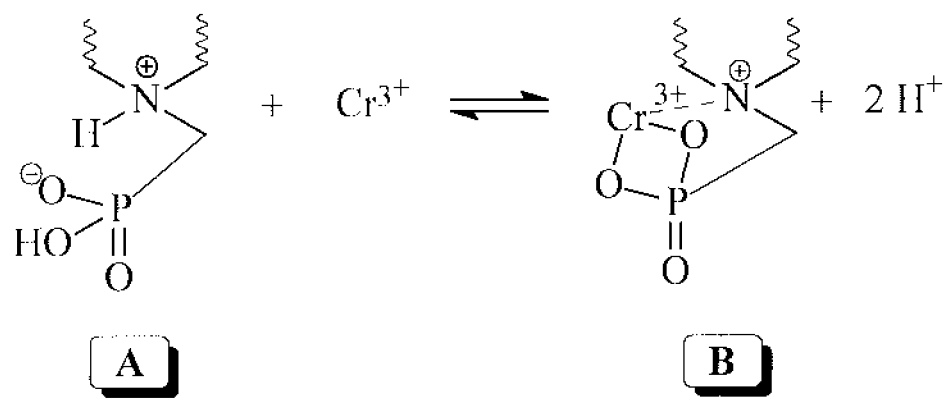
FIG. 15A shows an example mechanism of an aminopropylphosphonate group chelating with $Cr^{3+}$.
Figure 15B:
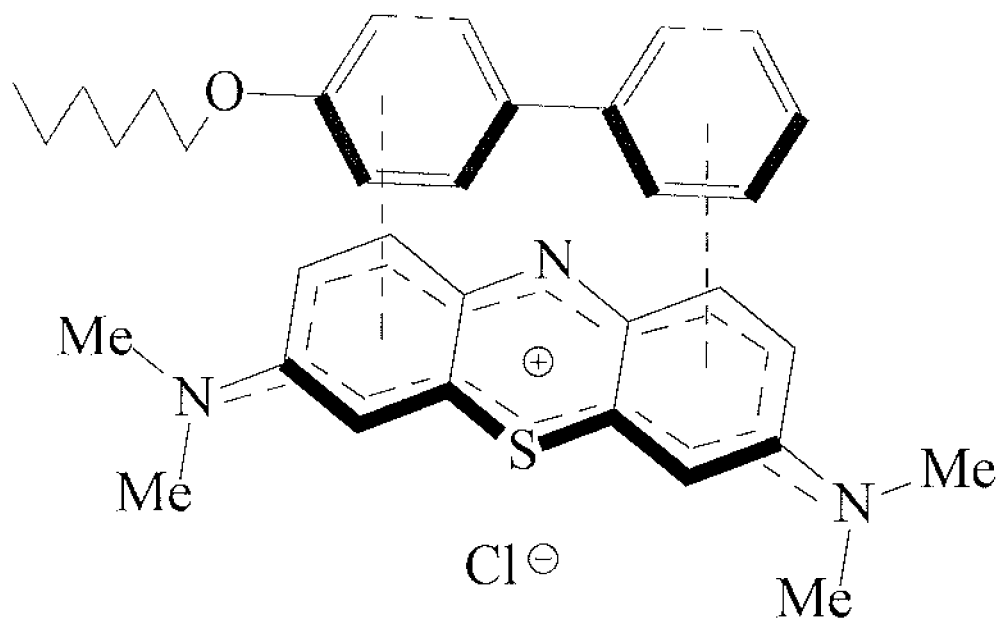
FIG. 15B shows an example structure of a biphenyl group having a hydrophobic interaction with a methylene blue chloride dye molecule.

The adsorption capacities of Cr(III) increases with increasing pH values in the range 3.0-7.0. The chelating functionality of aminopropylphosphonate may act as a tridentate ligand as depicted as B in FIG. 15A. See D. Kołodynska, Z. Hubicki, M. Geca, Application of a New-Generation Complexing Agent in Removal of Heavy Metal Ions from Aqueous Solutions. *Ind. Eng. Chem. Res.* 47 (2008) 3192-3199, incorporated herein by reference in its entirety. While the dye is soluble in water, it can also display hydrophobic interaction because of the organic skeleton. The adsorption of MB, as well as the other dyes tested, may well be augmented via hydrophobic interaction and π-π stacking as depicted in FIG. 15B. See X. He, K. B. Male, P. N. Nesterenko, D. Brabazon, B. Paull, and J. H. T. Luong, Adsorption and Desorption of Methylene Blue on Porous Carbon Monoliths and Nanocrystalline Cellulose, *ACS Appl. Mater. Interfaces,* 5 (2013) 8796-8804, incorporated herein by reference in its entirety. Owing to resonance, the highly dispersed positive charge in MB is expected to have weak ionic/electrostatic interaction with anionic—PO$_3$H$^-$ motifs in the resin.

The synthesis, chemical, morphological, and thermal evaluation of a novel resin have been described. The resin has the ability to simultaneously and efficiently adsorb Cr(III) ions and dyes including methyl orange, ERIOCHROME black T, rhodamine B, methyl red, and methylene blue from aqueous media. The resin showed excellent adsorption performance with high Langmuir monolayer capacity at pH 5. The dosage, temperature, and pH, as well as the surface active sites, all contribute to adsorption efficiency. The resin could be regenerated and reused for Cr(III) adsorption by treating a used resin with 0.1 M HNO$_3$. The reported resin is remarkably successful in removing metal ions including arsenic and dyes from industrial wastewater.

The invention claimed is:
1. A cross-linked polymer resin of formula (I)

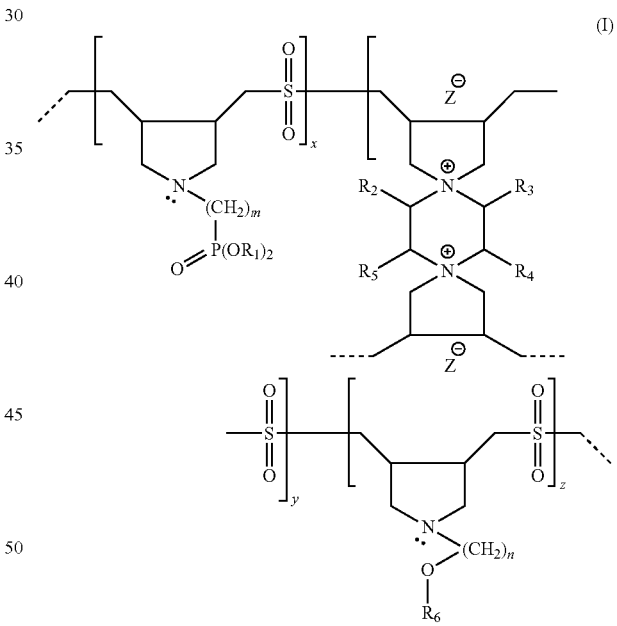

or a salt, solvate, tautomer, or stereoisomer thereof;
wherein each $R_1$ is —H, a positive counter ion, an optionally substituted alkyl, an optionally substituted cycloalkyl, or an optionally substituted aryl;
wherein each $R_2$, $R_3$, $R_4$, and $R_5$ is independently —H, an optionally substituted alkyl, an optionally substituted cycloalkyl, or an optionally substituted aryl;
wherein $R_6$ is an optionally substituted arylalkyl;
wherein m and n are independently a whole number in the range of 1-10;
wherein x, y, and z are independently a whole number greater than zero; and
wherein $Z^-$ is a counter ion.

2. The cross-linked polymer resin of claim 1, wherein a ratio of x toy is 5:1-10:1, and a ratio of z to y is 1:1-5:1.

3. The cross-linked polymer resin of claim 1, wherein a compound of formula (I) is porous and has a specific surface area of 40-70 m²/g.

4. The cross-linked polymer resin of claim 1, wherein a compound of formula (I) is porous and has an average pore diameter of 4-20 nm.

5. The cross-linked polymer resin of claim 1, wherein a compound of formula (I) is 7. A method for producing the cross-linked polymer resin of claim 1, comprising:

reacting an arylalkyl halide with a diallylamine to form a hydrophobic pendant monomer; and cyclocopolymerizing the hydrophobic pendant monomer with a N,N-diallyl aminoalkylphosphonate monomer, a tetraallylpiperazinium cross-linking monomer, dissolved sulfur dioxide, and a free radical initiator in a solvent to form the cross-linked polymer resin.

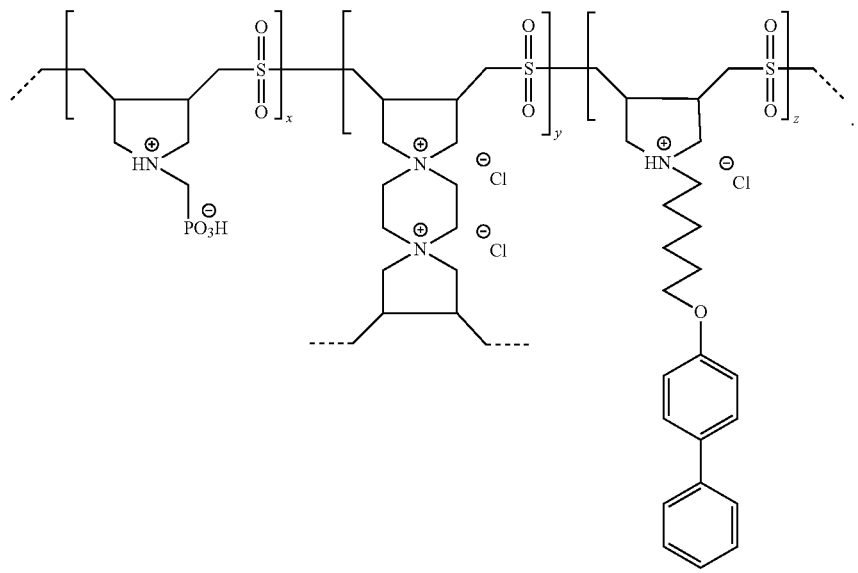

6. The cross-linked polymer resin of claim 1, wherein a compound of formula (I) is 8. The method of claim 7, wherein the N,N-diallyl aminoalkylphosphonate monomer has a structure of formula (II)

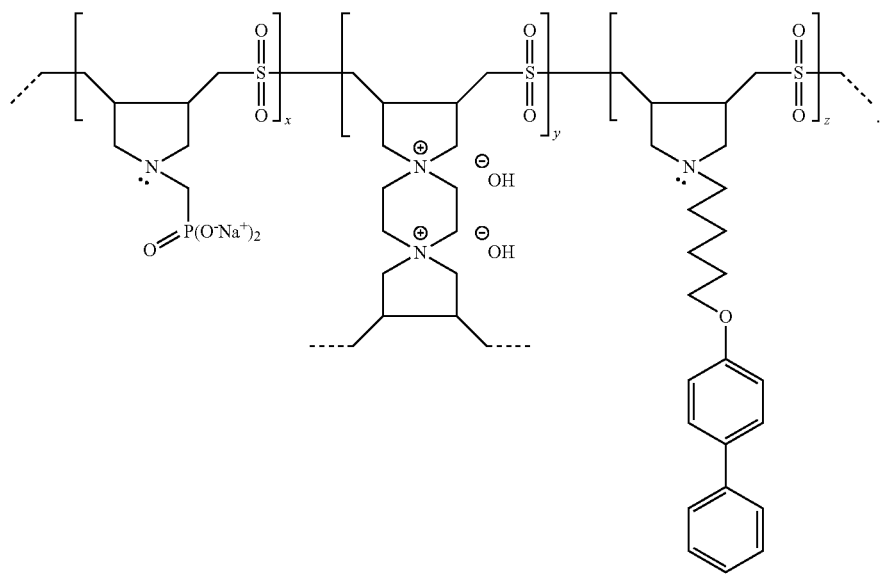

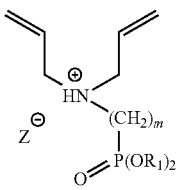
(II)

or a salt, solvate, tautomer, or stereoisomer thereof;
wherein each $R_1$ is —H, a positive counter ion, an optionally substituted alkyl, an optionally substituted cycloalkyl, or an optionally substituted aryl; and
m is a whole number in the range of 1-10.

9. The method of claim 8, wherein the N,N-diallyl aminoalkylphosphonate monomer compound of formula (II) is

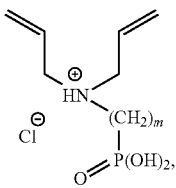

wherein m is 1 or 3.

10. The method of claim 7, wherein the tetraallylpiperazinium cross-linking monomer has a structure of formula (III)

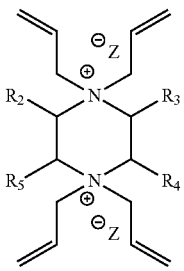
(III)

or a salt, solvate, tautomer or stereoisomer thereof;
wherein $R_2$, $R_3$, $R_4$, and $R_5$ are independently —H, an optionally substituted alkyl, an optionally substituted cycloalkyl, or an optionally substituted aryl; and
$Z^-$ is a counter ion.

11. The method of claim 10, wherein the tetraallylpiperazinium cross-linking monomer compound of formula (III) is

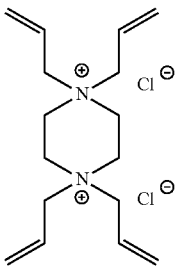

12. The method of claim 7, wherein the hydrophobic pendant monomer has a structure of formula (IV)

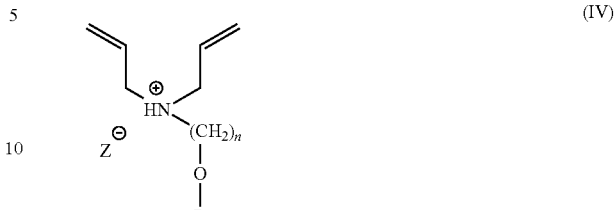
(IV)

or a salt, solvate, tautomer, or stereoisomer thereof,
wherein $R_6$ is an optionally substituted arylalkyl,
wherein n is a whole number in the range of 1-10, and
wherein $Z^-$ is a counter ion.

13. The method of claim 10, wherein the hydrophobic pendant monomer compound of formula (IV) is

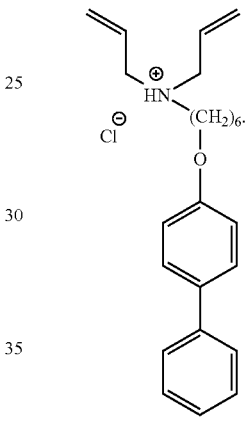

14. The method of claim 7, further comprising contacting the cross-linked polymer resin with a base to form an expanded cross-linked polymer resin.

15. A method of reducing a contaminant concentration from an aqueous solution with the cross-linked polymer resin of claim 1, comprising:
contacting the cross-linked polymer resin with an aqueous solution comprising the contaminant at a contaminant concentration of 0.5-100 mg/L,
wherein the cross-linked polymer resin reduces the contaminant concentration by adsorption.

16. The method of claim 15, wherein the cross-linked polymer resin has a concentration of 0.1-5.0 g/L in the aqueous solution, and
wherein the aqueous solution has a pH of 3-7.

17. The method of claim 15, wherein the contaminant is a heavy metal ion or a dye.

18. The method of claim 17, wherein the contaminant is a heavy metal ion, and
wherein the cross-linked polymer resin has an adsorption capacity of 10-100 mg of contaminant per g of the cross-linked polymer resin.

19. The method of claim 17, wherein at least 90% of the total mass of the heavy metal ion is removed from the aqueous solution in at least 9 minutes.

20. The method of claim 15, further comprising:
separating the cross-linked polymer resin from the aqueous solution to produce a recovered cross-linked polymer resin;

mixing the recovered cross-linked polymer resin with an acidic solution;

removing the acidic solution to produce a cleaned cross-linked polymer resin; and reusing the cleaned cross-linked polymer resin, which maintains an adsorption capacity for at least 5 purification cycles.

* * * * *